(12) United States Patent
Caraballoso

(10) Patent No.: US 9,694,905 B2
(45) Date of Patent: *Jul. 4, 2017

(54) RETRACTABLE COMPOSITE ROTOR BLADE ASSEMBLY

(71) Applicant: Esteban A. Caraballoso, Swarthmore, PA (US)

(72) Inventor: Esteban A. Caraballoso, Swarthmore, PA (US)

( * ) Notice: Subject to any disclaimer, the term of this patent is extended or adjusted under 35 U.S.C. 154(b) by 342 days.

This patent is subject to a terminal disclaimer.

(21) Appl. No.: 14/506,595

(22) Filed: Oct. 3, 2014

(65) Prior Publication Data

US 2015/0086365 A1    Mar. 26, 2015

Related U.S. Application Data

(63) Continuation of application No. 13/892,139, filed on May 10, 2013, now Pat. No. 8,851,842, which is a continuation of application No. 12/582,889, filed on Oct. 21, 2009, now Pat. No. 8,459,948.

(60) Provisional application No. 61/108,282, filed on Oct. 24, 2008.

(51) Int. Cl.
| | |
|---|---|
| *B64C 11/00* | (2006.01) |
| *B64C 27/50* | (2006.01) |
| *B64C 27/473* | (2006.01) |
| *B64C 27/51* | (2006.01) |
| *B64C 27/46* | (2006.01) |
| *B64C 11/28* | (2006.01) |

(52) U.S. Cl.
CPC .............. *B64C 27/50* (2013.01); *B64C 11/28* (2013.01); *B64C 27/46* (2013.01); *B64C 27/473* (2013.01); *B64C 27/51* (2013.01); *B64C 2027/4736* (2013.01); *F05D 2250/90* (2013.01)

(58) Field of Classification Search
CPC ....... B64C 27/46; B64C 27/473; B64C 27/50; B64C 27/51; B64C 11/28; F05D 2260/90
See application file for complete search history.

(56) References Cited

U.S. PATENT DOCUMENTS 2,713,393 A * 7/1955 Isacco .................... B64C 11/003
                                                                       244/218
3,249,160 A * 5/1966 Messerschmitt ........ B64C 27/46
                                                                       416/174

(Continued)

*Primary Examiner* — Ninh H Nguyen
(74) *Attorney, Agent, or Firm* — Franco S. De LiGuori; DP IP Group

(57) ABSTRACT

A retractable rotor blade assembly includes a rotor hub assembly having a rotor hub wall, a pitch disc mounted to the rotor hub wall for undergoing rotation about a longitudinal axis, and retractable rotor blades configured to be extended and retracted relative to the rotor hub assembly. Each of the rotor blades has an interlink assembly, a blade base, and a damper for dampening movement of the interlink assembly during extension and retraction of the rotor blade. The interlink assembly includes a plurality of interconnected link base subassemblies each configured to be translated along a span of the rotor blade such that each subsequent link base subassembly becomes stacked one atop the other while remaining connected to a next link base subassembly. The blade base is interconnected between the pitch disc of the rotor hub assembly and one of the interconnected link base subassemblies.

12 Claims, 28 Drawing Sheets

(56) References Cited

U.S. PATENT DOCUMENTS

| | | | | |
|---|---|---|---|---|
| 3,501,248 A | * | 3/1970 | Brocker | ............... B64C 11/003 416/89 |
| 8,459,948 B2 | * | 6/2013 | Caraballoso | ............ B64C 27/46 416/143 |
| 8,851,842 B2 | * | 10/2014 | Caraballoso | ............ B64C 27/46 416/143 |

* cited by examiner

RETRACTABLE COMPOSITE ROTOR BLADE ASSEMBLY

RELATED APPLICATIONS

This application is a continuation of U.S. patent application Ser. No. 13/892,139, filed May 10, 2013, which is a continuation of U.S. patent application Ser. No. 12/582,889, filed October 21, 2009, now U.S. Pat. No. 8,459,948, which claims priority benefit of U.S. Provisional Patent Application No. 61/108,282, filed Oct. 24, 2008, all of which are incorporated herein by reference in their entirety.

BACKGROUND OF THE INVENTION

1. Field of the Invention

The present invention relates primarily to the field of aerospace and the field of lift generating structures. More specifically, the invention relates to the design of retractable rotor blades for a rotor blade assembly used to produce lift and thrust for vertical and short take off vehicles.

2. Description of the Related Art

Rotor blades have been used for many years to achieve flight. A shortcoming of the related art is that conventional rotor blades and rotor blade assemblies have longitudinally rigid structures (U.S. Pat. No. 7,475,847). Many rotor blades are now made of carbon fiber, fiber glass and other composite materials. These conventional composite rotor blades and composite rotor blade assemblies are manufactured to be used as rigid structures, not capable of being collapsed to a smaller volume (U.S. Pat. No. D 580,344). In order to be effective, conventional rotor blades often require very large rotor blade spans. Large rotor blades customary in VTOL (vertical take-off and landing) and STOL (short take-off and landing) vehicles typically require large storage space to house them.

In other examples of the related art, rotor blades are designed to reconfigure into a more stowable state (U.S. Pat. No. 6,176,679). This is often because they are to be housed indoors when not in use, or as an attempt to reduce the breadth of the rotor blade's slipstream when transported. Another example of the related art is the ability for some rotor blades to be capable of folding onto themselves (U.S. Pat. No. 4,086,025). Another example of the related art is the ability for some rotor blades to be retracted using a telescoping system (U.S. Pat. No. 6,972,498). The aforementioned example is made retractable by concentric telescoping solid rotor blade cross sections. A shortcoming of telescopically retracted systems is that they require each subsequent section of the rotor blade to be of a different dimension than the preceding one. This reduction of dimension and non-uniformity of the blade sections creates aerodynamic instabilities and it is not desirable.

Since the development of the airplane there have been many attempts to combine the ability of a flying vehicle with that of an automobile (U.S. Pat. No. 7,481,290). One particular example of such a vehicle has folding wings (U.S. Pat. No. 7,462,015). Another vehicle example requires the user to completely remove the lifting surfaces from the vehicle when being used as an automobile. Other examples of the related art incorporate road vehicles equipped with full scale aircraft wings. Other examples of the related art use rotor blades which fold upon themselves (U.S. Pat. No. 7,584,923). These designs are too cumbersome and do not provide the required compactability of the rotor blades to be used practically by road worthy vehicles. Some examples of the related art use fan blades to generate lift, but these require the fan blades to be operated at higher rpm. The requirement for higher rpm is due mainly to the small dimensions of the fan blades. Another example of the related art use fabrics as the exterior surface of the blade which is exposed to the airstream (U.S. Pat. No. 4,411,398).

Other objects and advantages of the present invention will become apparent from the following descriptions, taken in connection with the accompanying drawings, wherein, by way of illustration and example, embodiments of the present invention are disclosed.

SUMMARY OF THE INVENTION

In accordance with preferred embodiments of the invention, a retractable composite impeller (rotor blade) assembly is described herein. The primary difference between the present invention and the related art is that conventional rotor blades and rotor blade assemblies have longitudinally rigid blades. Furthermore, unlike telescopically retracted systems, the present invention does not require each subsequent section of the rotor blade to be of a different dimension than the preceding one. The present invention also does not restrict the length of the rotor blade. The current invention allows for controlled dynamic deployment of rotor blades. The present invention also increases the speed and precision with which the rotor blades can be retracted and deployed. The present invention makes it possible to make retractable fan blades.

The present invention includes major and minor components, assemblies and subassemblies arranged such that together they form a mutually reinforcing structure capable of being deployed to generate the required forces for flight and of being retracted to a considerably smaller volume when not in use or stored. According to the present invention, a vehicle equipped with the current invention will be capable of vertical takeoff and landing. In its retracted state, the current invention will make it possible for the vehicle to travel along automobile roads of standard dimension. The constituent components and subassemblies of the present invention may comprise multiple instances of similar or dissimilar materials and employ the most desirable characteristics of each material.

Due to improvements made in the area of composite materials, the present invention employs these materials to create retractable rotor blades which do not require manual manipulation or removal of any part of the rotor blade assembly (also referred to herein as a rotor system) in order to work. By using flexible and strong composite materials to bear the primary stresses during operation, the present invention reduces the loads experienced by the remaining rigid support structure and consequently reduces the amount of creep experienced by the rotor system. Composite materials are exceptionally well suited at resisting tensile stresses and as such are ideal materials for this application. Typical composite materials include, but are not limited to, carbon and glass fibers, elastomers, aramids and other high strength polymers. Another advantage of the rotor blades of the present invention is its ability to be refitted or refurbished with very little modification and limited part replacement. In other words, if the exterior layers of the present invention are damaged they can be easily replaced without needing to replace the entire rotor system and at a considerably lower cost than conventional rotor blades.

The primary components and assemblies of the of the rotor blade assembly according to the present invention may include a rotor hub assembly, a rotor axle assembly, a retracting reel assembly, a blade internal support structure, a release cable assembly, a helical ribbon assembly having helical wound ribbons, an exterior sleeve assembly having a flexible sleeve, a blade casing assembly, and an extendable zipper mechanism. A rotor axle serves as an axis of rotation and to transmit torque to the retractable composite rotor blade assembly. The purpose of the rotor blade assembly is to generate lift when in operation. The rotor hub assembly provides a structure onto which the rotor blade assembly is connected. The rotor hub assembly includes a rotor hub that houses a pitch disk through which torque is transmitted to the rotor blade assembly such that the angle of attack of the rotor blade assembly is able to be altered.

The components of the rotor blade assembly have a characteristic aerodynamic profile and/or are capable of conforming to such a profile. The rotor blade assembly may also include a blade base and an interlink base assembly. The purpose of the blade base is to connect the rotor hub to the interlink base assembly. In one possible embodiment of the invention, the purpose of the interlink base assembly is to form a rigid structure over which the flexible sleeve can be fitted. In a second possible embodiment of the invention, the interlink base assembly is also fitted with a plurality of the helically wound ribbons. The purpose of the helically wound ribbon is to reinforce the interlink base assembly and form a rigid structure over which the flexible sleeve can be fitted. Another purpose for the helically wound ribbon is to constrict, lock and rigidify the interlink base assembly when it is in use and allow the interlink base assembly to retract when not in use.

The interlink base assembly may include a plurality of link base subassemblies. In one possible embodiment of the invention, each link base subassembly comprises a rigid aerofoil shaped cross section and mechanical linkages. In a second embodiment of the invention, each link base subassembly also includes hinged plates. Each link base subassembly is mechanically connected to another link base subassembly through linkages to form a longitudinally connected structure capable of being stacked one atop the other. The rigid aerofoil shaped cross sections are stacked one atop the other and mechanically connected to allow them to separate while remaining one assembly. Each link base subassembly is equipped with a locking mechanism in order to ensure rigidity of the entire interlink base assembly when deployed. Each locking mechanism can be activated independently or simultaneously by a release cable. The release cable is part of the retraction assembly which is housed in the rotor hub.

In another possible embodiment of the invention, the flexible sleeve comprises elastic ribs, an elastic and flexible skin and an elastic sling membrane. In a second possible embodiment of the invention, the flexible sleeve can include a resealable elastic trailing edge. The purpose of the flexible sleeve is to be the outer most layer of the rotor blade assembly and, as such, it is exposed to the airstream. The flexible sleeve also serves to reinforce the rotor blade assembly and provide a smooth exterior surface for the rotor blade assembly. The flexible sleeve may be constructed of woven, braided or elastomeric material to form a covering for the cross sections and mechanical linkages of the interlink base assembly. In a second embodiment of the invention, with the use of the elastic trailing edge the rotor blade assembly is equipped with an extendable zipper mechanism. The purpose of the extendable zipper mechanism is to separate and also to reseal an upper and a lower section of the elastic trailing edge. The purpose of the blade base casing is to house the rotor blade assembly when stowed. It is to be understood that the present invention can also be used to form a wing, that is to say, it can be easily modified to be used as a wing of an airplane.

BRIEF DESCRIPTION OF THE DRAWINGS

Definition of Orientation:
The drawings of the invention have been illustrated in agreement with the preferred embodiment of the invention. The figure numbers labeled throughout this document are located below the figures they refer to.

DETAILED DESCRIPTION OF THE INVENTION

A technical description of the major subassemblies of the invention will follow.

Rotor Blades

Figure 1:
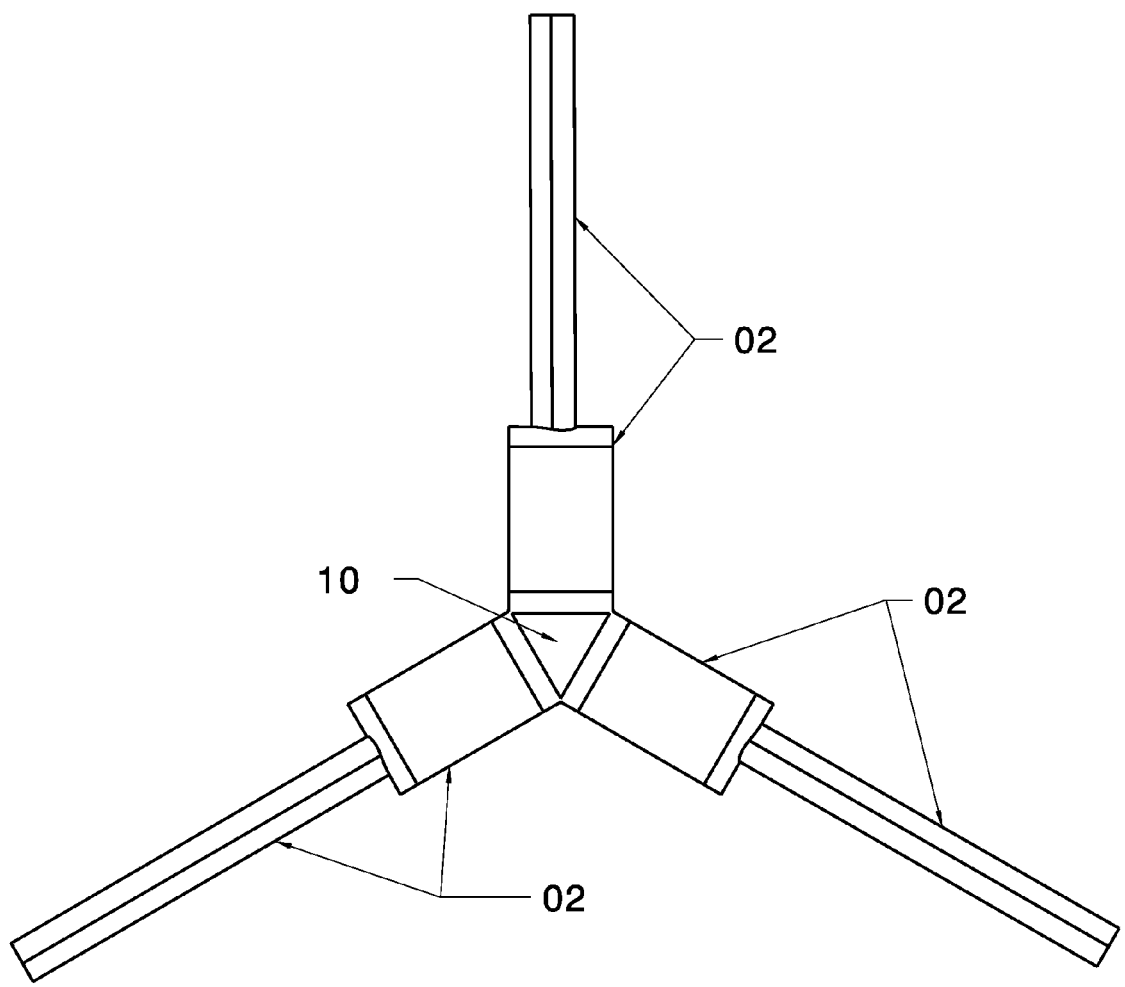
FIG. 1 is a top view of the rotor blade assembly in its extended condition comprising three rotor blades.
Figure 2:
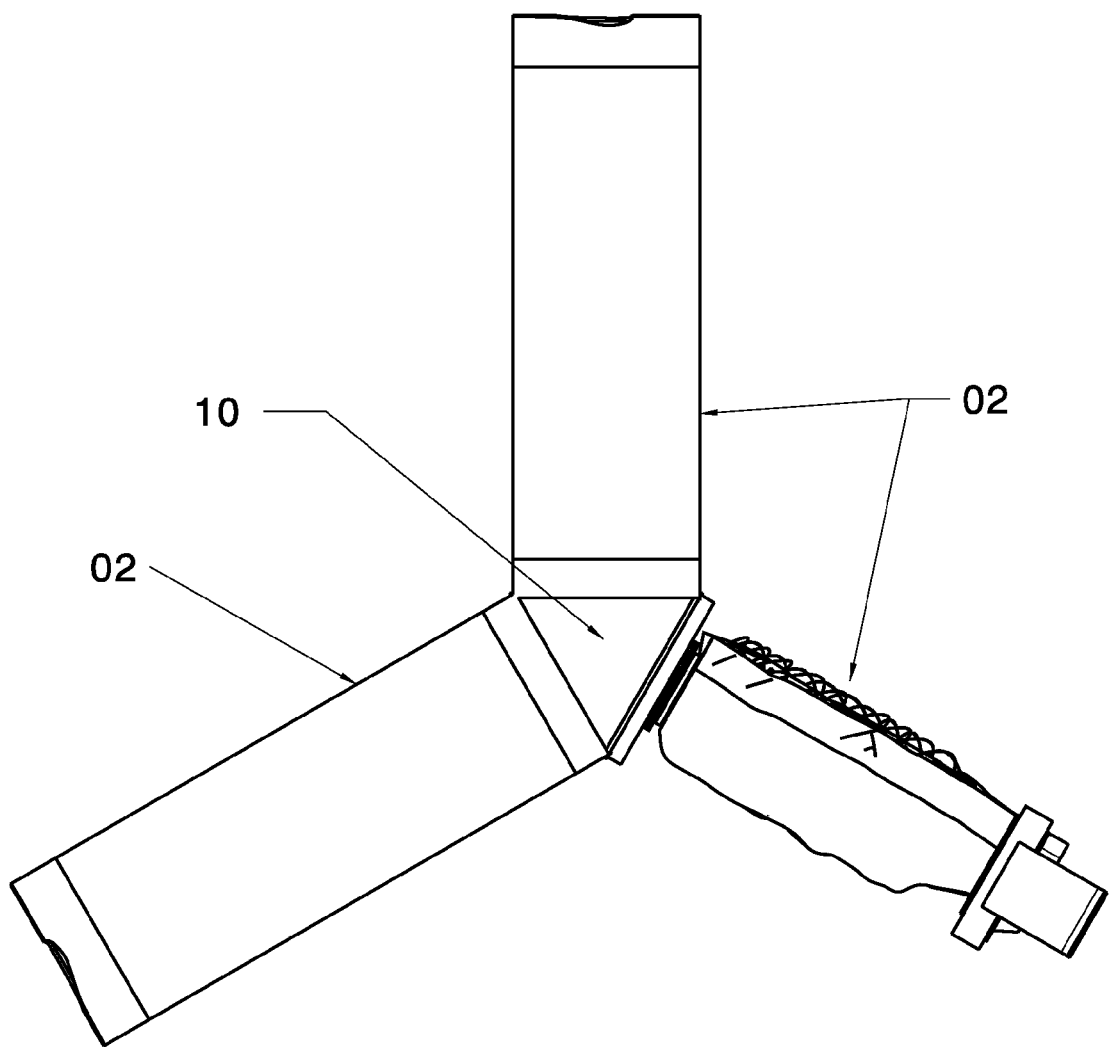
FIG. 2 is a top view of the rotor blade assembly in its retracted condition showing the internal assembly components of one of the rotor blades.

Referring to FIG. 1 and FIG. 2, the retractable composite impeller (rotor blade) assembly embodiment comprises a plurality of rotor blades 02 (three in this embodiment) as depicted. FIG. 1 also shows the retractable composite rotor blade assembly of a first preferred embodiment comprising the major subassemblies and in its fully extended condition. The geometry of a rotor hub assembly 10 corresponds to the number of rotor blades 02. In this configuration, each rotor blade assembly 02 experiences the same centripetal force during rotation and deceleration.

Referring to FIG. 1 thru FIG. 4, the major subassemblies of the rotor blade assembly of the present invention work in concert to allow each rotor blade 02 to have the ability to become extended when the rotor system is rotated, and contracted when the rotor system is forced to come to rest and in a controlled manner by way of a retracting reel assembly 13. The primary subassemblies interface with each other in such a way that they transmit the loads developed during rotation and act to reinforce each other thereby strengthening the rotor system as a whole.

Figure 3:
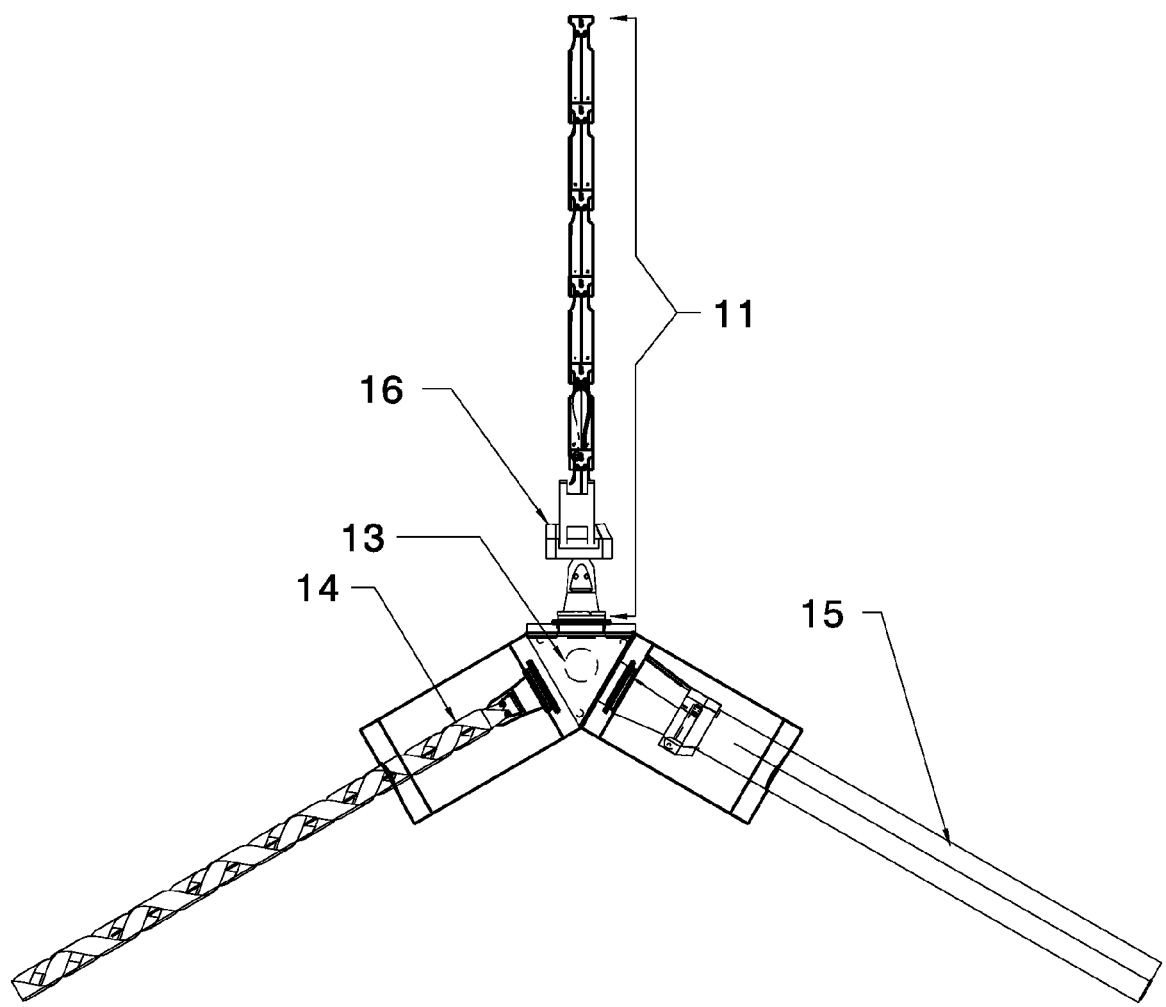
FIG. 3 is a top view of the rotor blade assembly showing the major assemblies which are common to each rotor blade and have been shown here individually for clarity.
Figure 4:
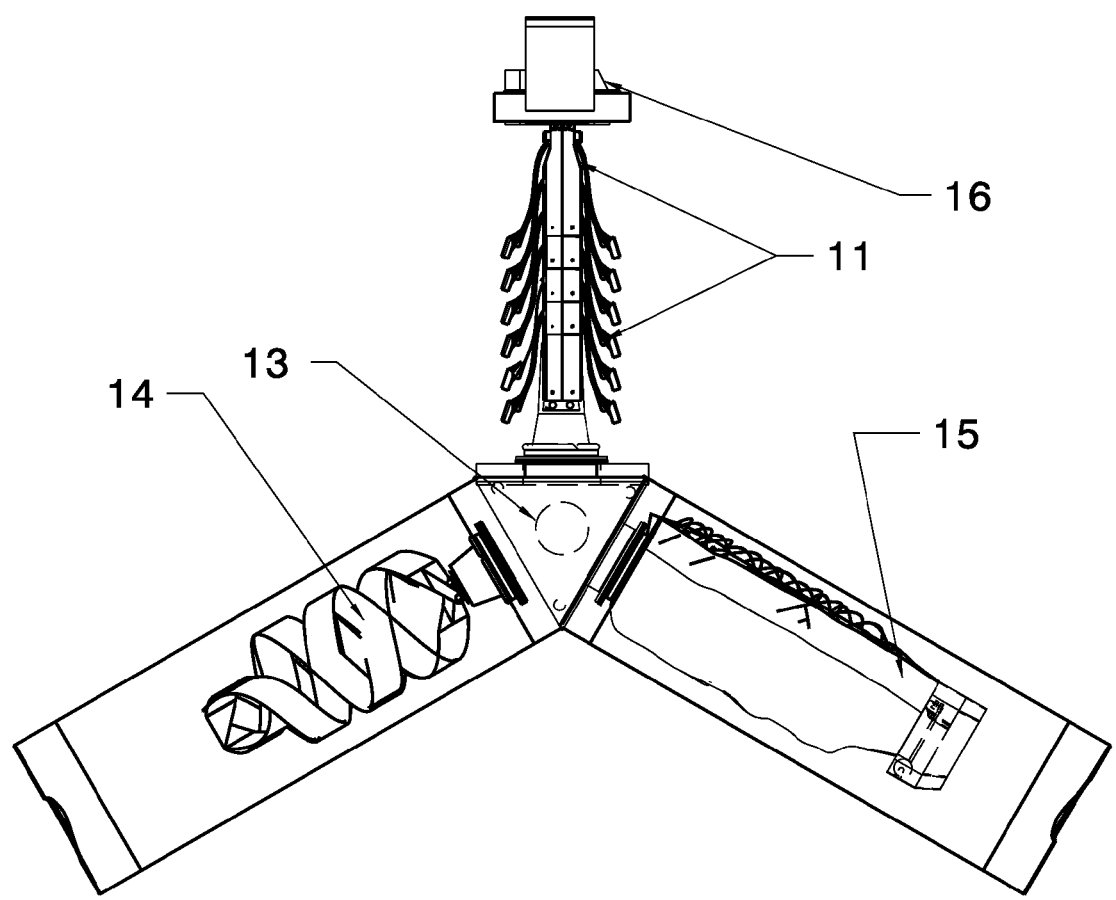
FIG. 4 is a top view of the rotor blade assembly in its retracted condition showing the major assemblies which are common to each rotor blade.
Figure 5:
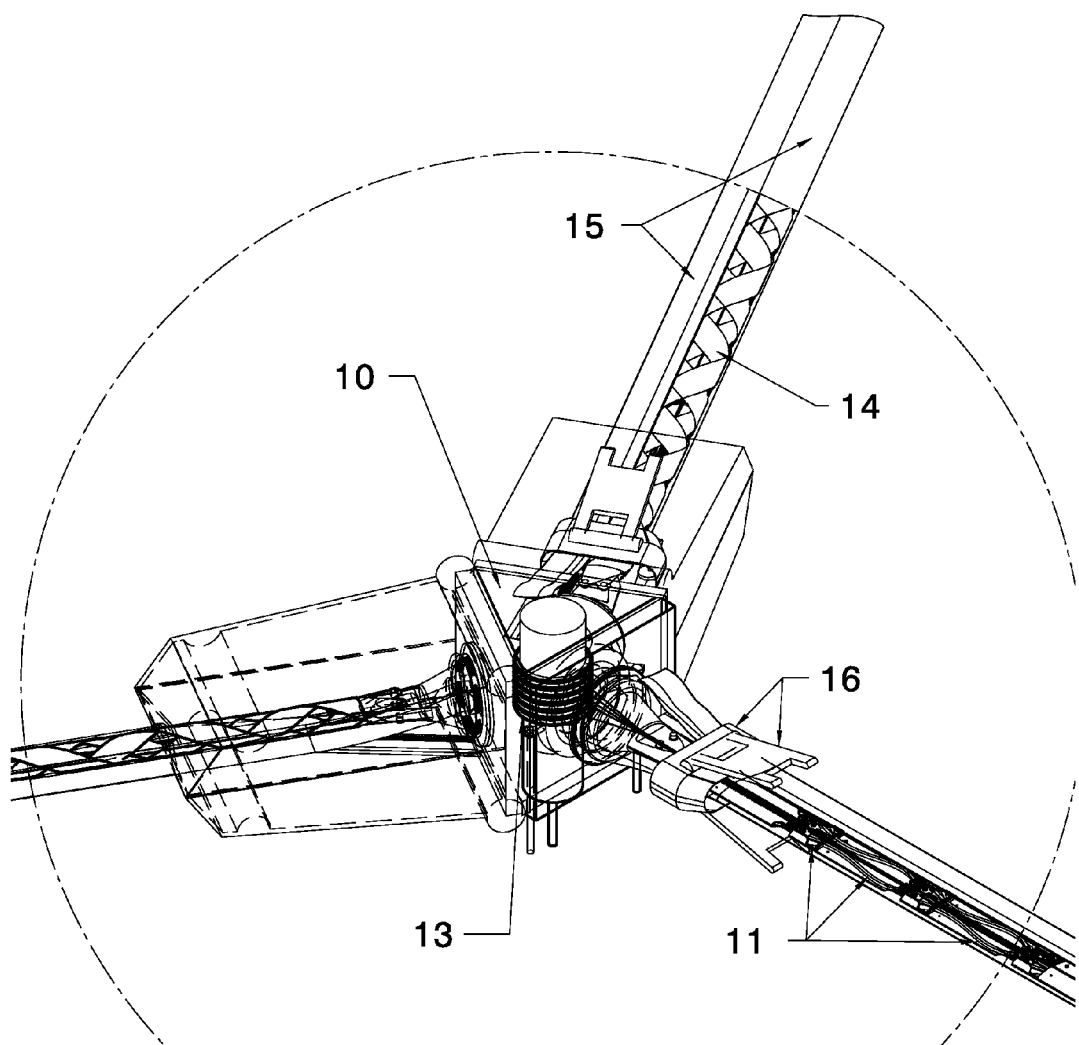
FIG. 5 is a perspective view of the rotor blade assembly showing the internal components of the rotor hub and showing the internal components of the major assemblies which are common to each rotor blade.
Figure 6:
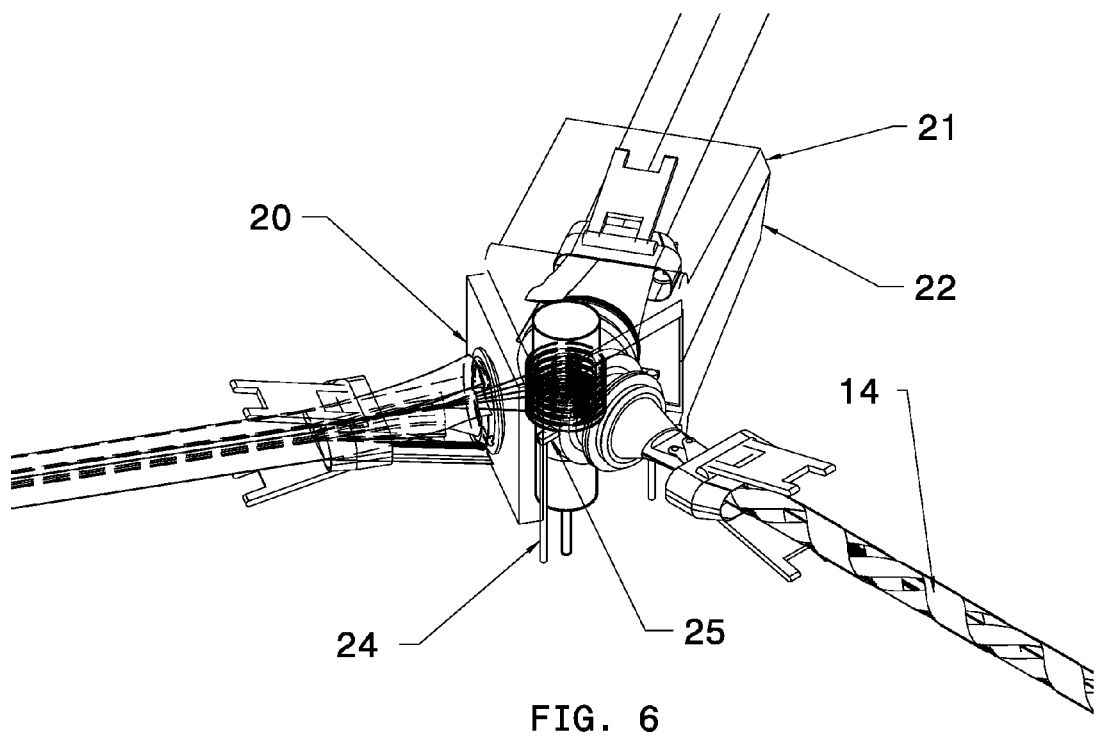
FIG. 6 is a perspective view of the rotor blade assembly showing release cables.

Referring to FIG. 3 and FIG. 4, each rotor blade 02 comprises identical components and subassemblies with the exception of components and subassemblies of rotor blade 02 which are shared by way of rotor hub assembly 10 and retraction or retracting reel assembly 13. Referring to FIG. 1 thru FIG. 4 and FIG. 11, the major assemblies which make up the rotor blade assembly of the present invention are the rotor hub assembly 10 having within it the retracting reel assembly 13, an interlink assembly 11 which comprises a blade base 30 and a plurality of link base subassemblies 12 and is connected to an exterior of a rotor hub wall 20 of rotor hub assembly 10, a helical ribbon assembly 14 which is wrapped around the interlink assembly 11, a flexible and elastic sleeve 15 which envelopes both the helical ribbon assembly 14 and the interlink assembly 11, and a zipper slider mechanism 16 which encompasses the flexible and elastic sleeve 15 and serves to open and close a closure located at a trailing edge of the flexible and elastic sleeve 15.

Several components of the present invention are standard mechanical parts which are ubiquitous. These standard parts include helical springs 03, torsion springs 04, bolts and screws 05. Their usages throughout the invention is apparent to anyone skilled in the art related to the present invention. Standard parts which share the same label are instantiated throughout the various subassemblies of the invention. Wherever they are referenced it is to convey that they perform the same type of function and can be used in different locations.

The retraction reel assembly 13 is mechanically connected to components which make up the rotor blade assembly. With additional reference to FIG. 20, when the rotor system is rotated about an interior rotor axle 72 defining a central axis or axis of rotation, a centripetal force is developed about the central axis which forces the components which are free to move to be extended radially outward from the axis of rotation. When the rotor system is brought to rest by the retraction reel assembly 13 which includes a breaking actuator 73, each component of the rotor blade 02 which is connected to the retraction reel assembly 13 by way of release cables 70 is pulled radially inward towards the central axis. This is the primary operation which enables the rotor system to be extended or retracted.

Rotor Hub Assembly

The rotor hub assembly 10 serves as the main structure to which each rotor blade 02 is connected. It also houses the retraction reel assembly 13 (FIGS. 3-5) which, as further described below, includes an exterior rotor axle 71, the interior rotor axle 72 (FIG. 20-21) and the breaking actuator 73 (FIG. 21), where the exterior and interior rotor axles 71, 72 share the same rotation and impart torque to the entire rotor system. The rotation of breaking actuator 73 is allowed to be neutral when not engaged. Referring to FIG. 5 thru FIG. 9, the rotor hub assembly 10 comprises a rotor hub wall 20 which has at its upper edge a hinged top casing 21 and has at its bottom edge a hinged bottom casing 22. The rotor hub wall 20 also has through it a pitch disc 23. Pitch disk 23 is able to rotate about its longitudinal axis and has a moment arm 25, and connected to the moment arm 25 is a push rod 24. The rotor hub assembly 10 also has a top casing 26 and a bottom hub casing 27. Referring to FIG. 6, FIG. 8, FIG. 9 and FIG. 11, one extremity of push rod 24 is connected to the pitch disc 23 by a ball and socket connection through moment arm 25, and the other extremity of push rod 24 may be connected to a rotating swash plate. As push rod 24 is moved up or down it causes the pitch disc 23 to rotate. The rotation of the pitch disc 23 is transmitted to the interlink assembly 11, thereby changing the angle of attack of the rotor blade 02. When the rotor system is retracted, the elastic and flexible sleeve 15 is stowed within top and bottom hinged casings 21 and 22.

Figure 7:
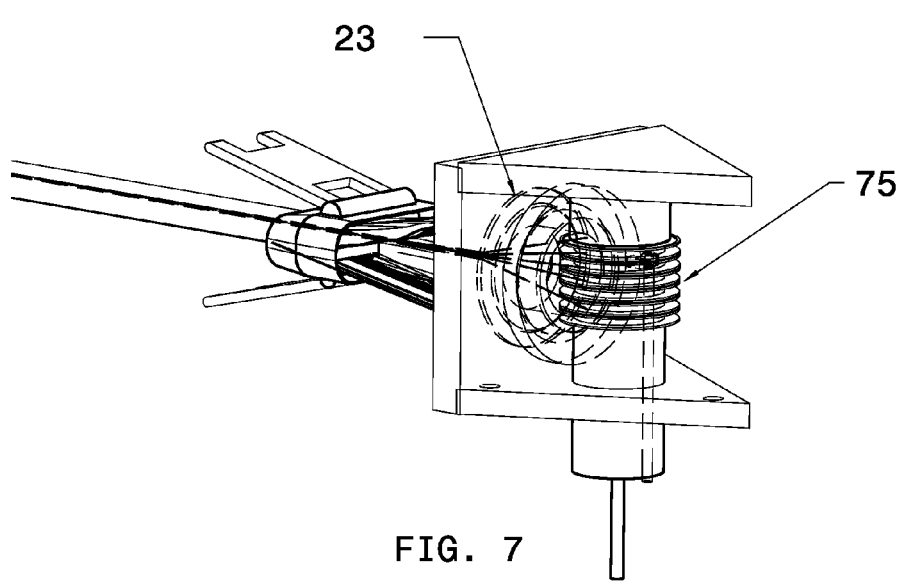
FIG. 7 is a perspective view of a recoiling (retraction) reel assembly and showing outlines of pitch discs.
Figure 9:
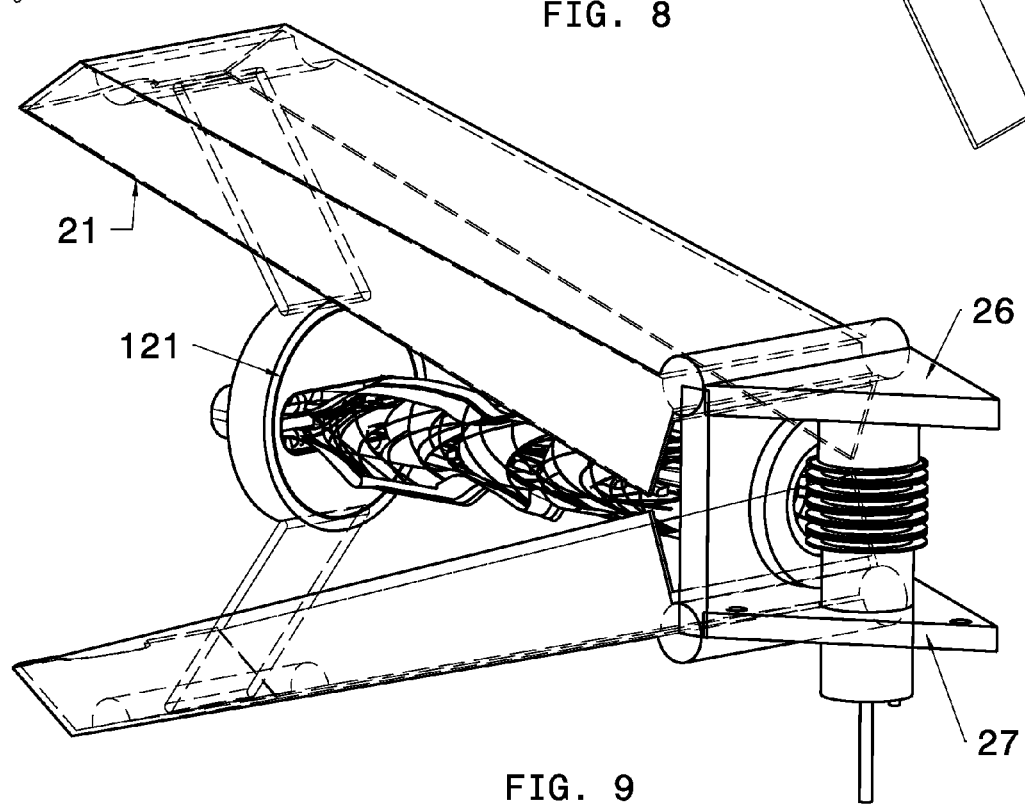
FIG. 9 is an isometric view of one of the rotor blades in its retracted condition showing hinge connections between the blade casings to the hub wall and a zipper slider mechanism.
Figure 19:
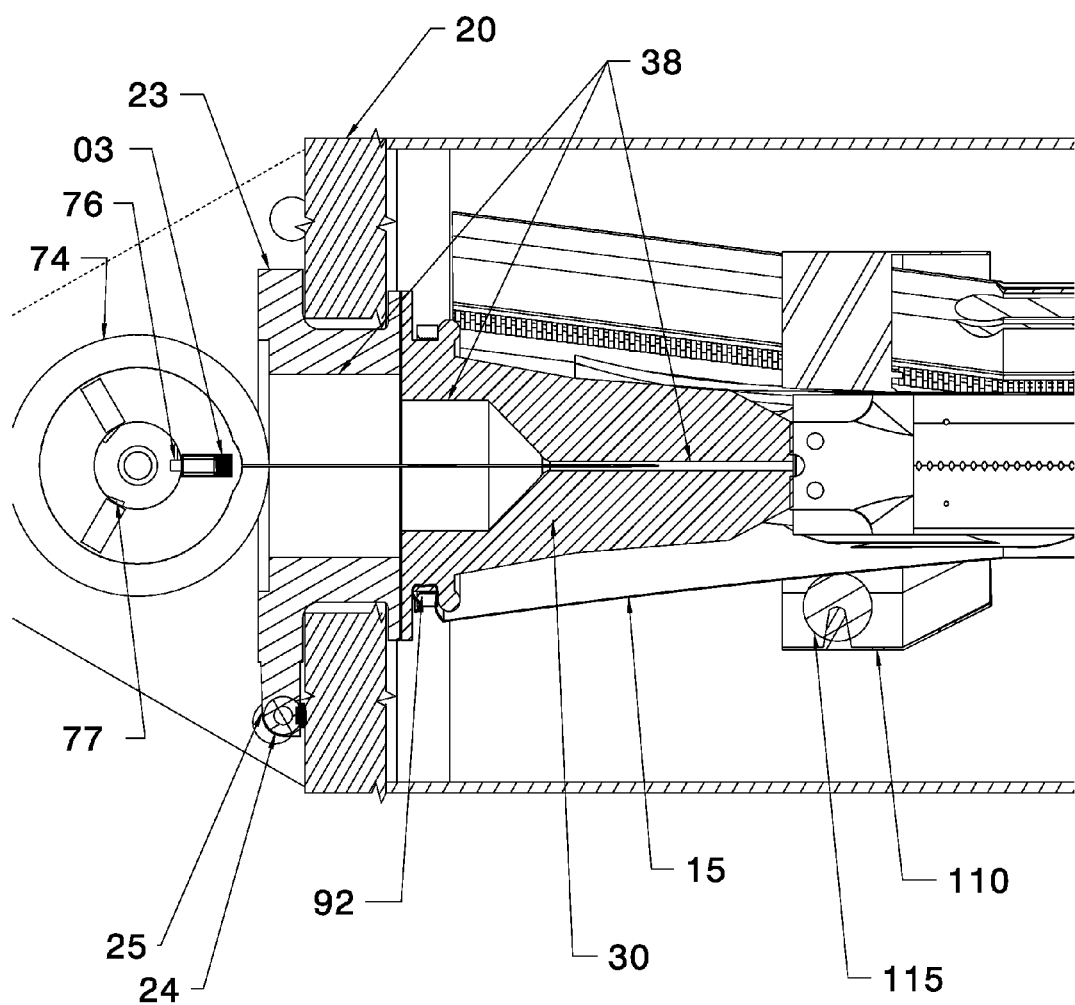
FIG. 19 is a partial top cross-sectional view of the internal components of one rotor blade showing the components which act to retract the rotor system.
Figure 20:
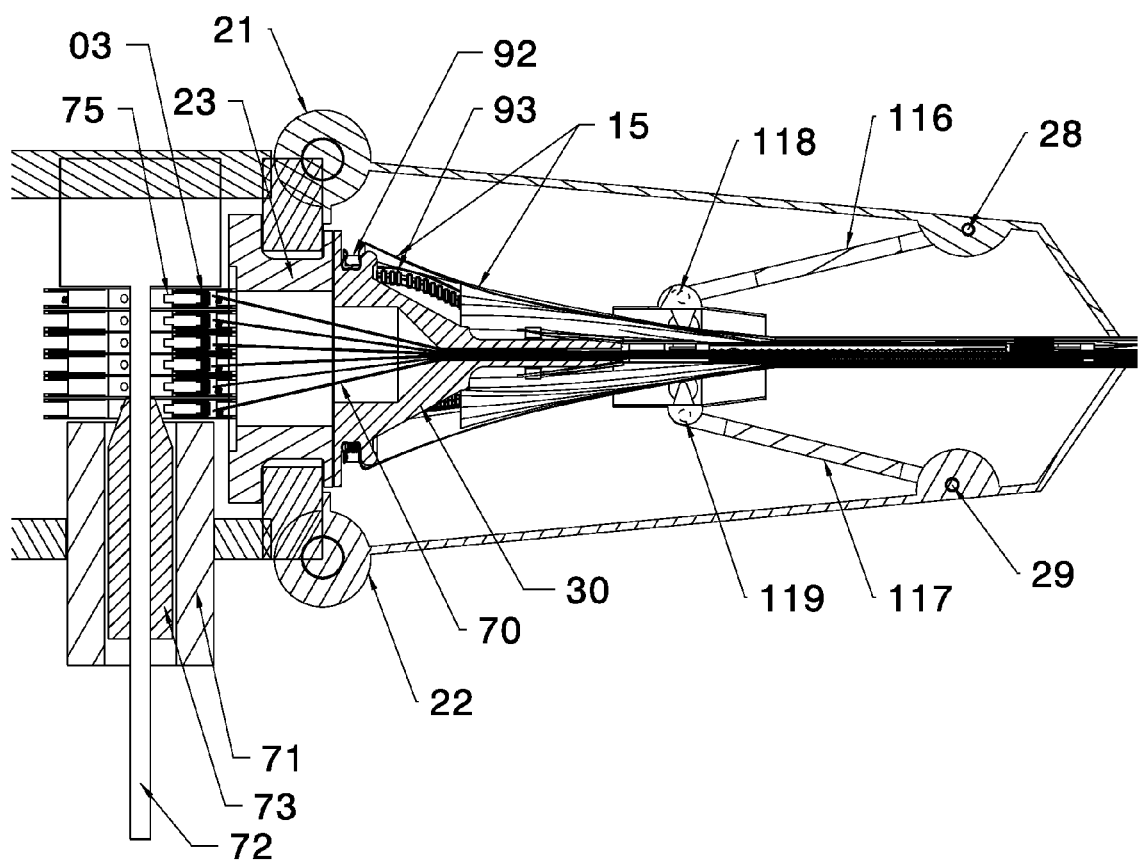
FIG. 20 is a partial side cross-sectional view of the rotor blade assembly showing the mechanical arrangement of the retraction assembly including release cables in the extended condition.

Referring to FIG. 7 and FIG. 19, pitch disc 23 has a circular groove which allows it to be held in place by rotor hub wall 20 while remaining free to rotate along its longitudinal axis. Pitch disc 23 and blade base 30 are axially coincident and have a common faying surface by which they are rigidly or mechanically connected. Referring to FIGS. 9 and 20, top hinged casing 21 and bottom hinged casing 22 are connected at the bottom and top edges of the rotor hub wall 20 by means of hinge connections 28, 29. The purpose of exterior and interior rotor axles 71, 72 (FIG. 21) is to provide torque to the retractable composite rotor assembly of the present invention.

Figure 21:
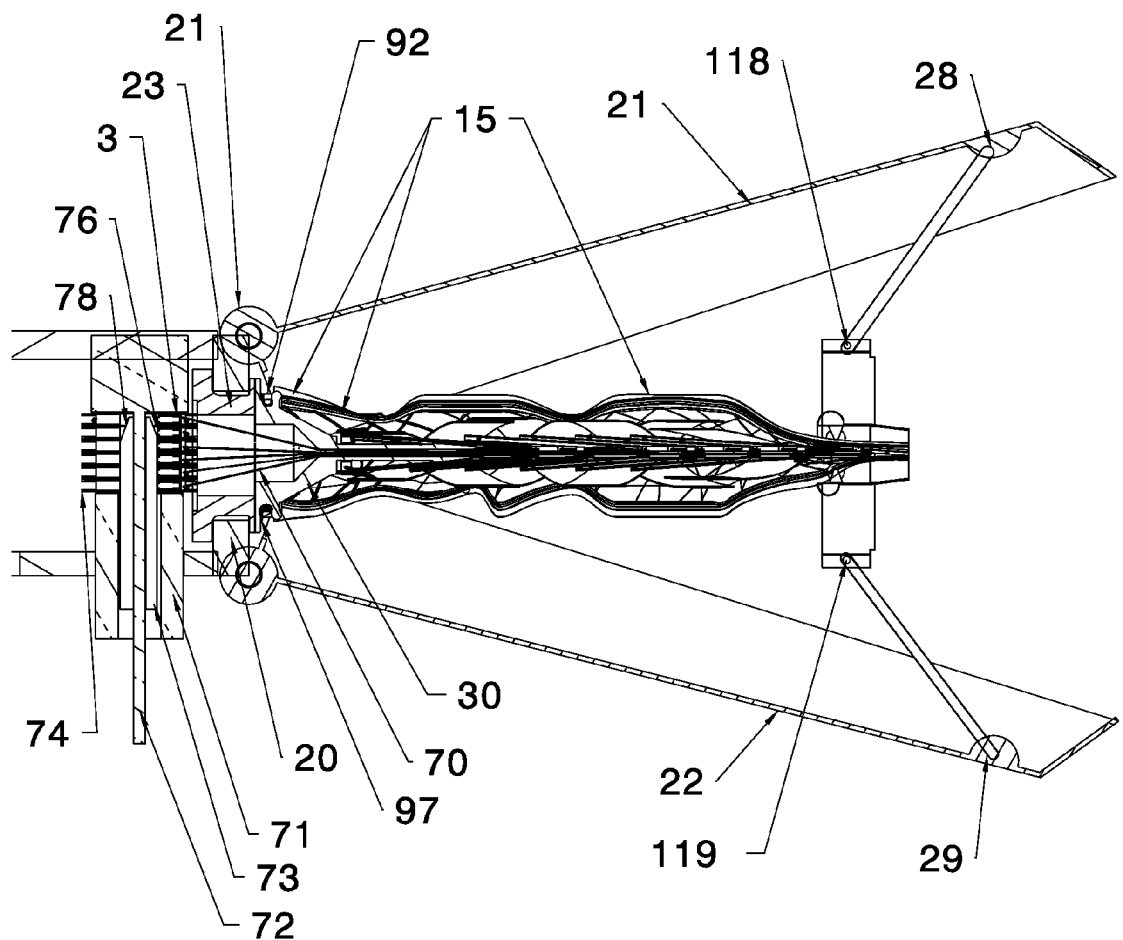
FIG. 21 is a side view in partial cross-section of the rotor blade assembly showing the location of the zipper slider mechanism when the rotor system is retracted.
Figure 22:
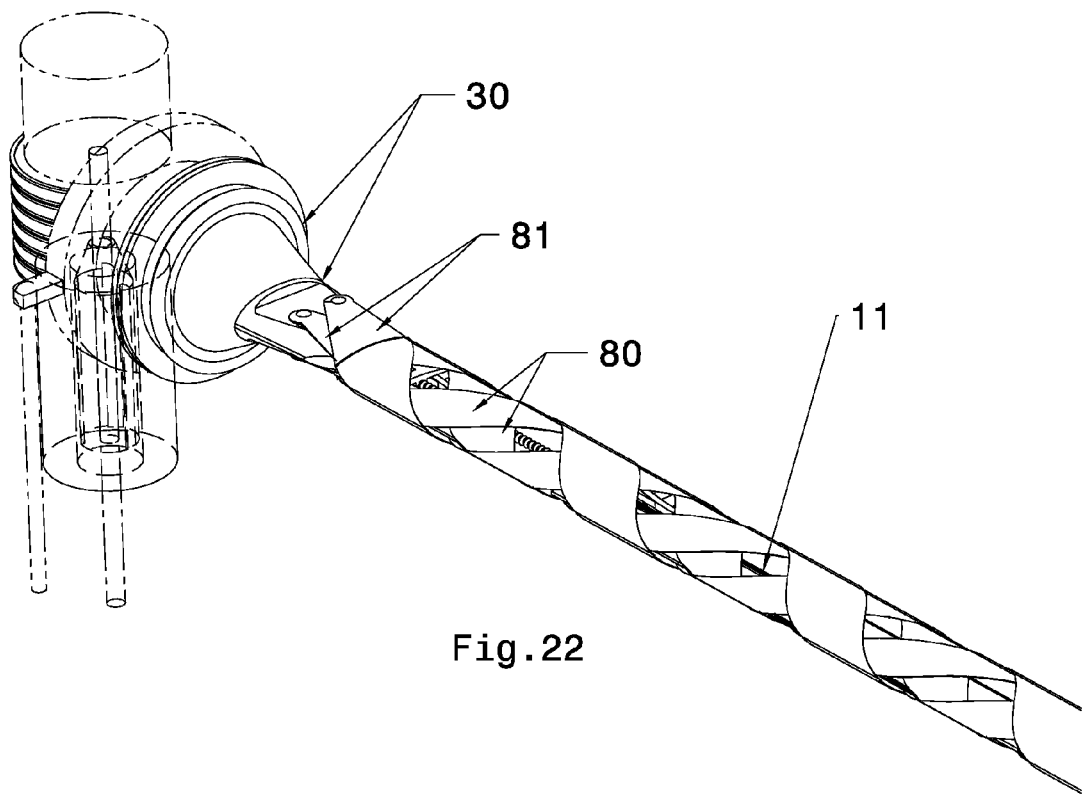
FIG. 22 is an isometric front view of the internal skeleton wrapped by the helically wound ribbon.
Figures 33, 34:
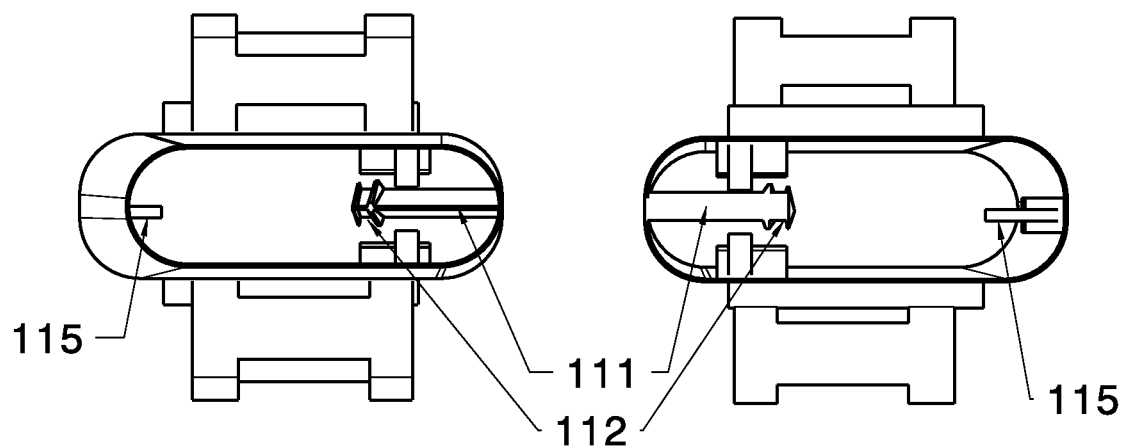
FIG. 33 is a front axial view of a zipper slider of the invention.
FIG. 34 is a rear axial view of the zipper slider of the invention.

Referring to FIG. 19 thru FIG. 21, the casings 21 and 22 are opened and shut by means of hinged connections to the rotor hub wall 20. Upon rotation of the rotor system, each hinged casing 21 and 22 is affected by the centripetal force of rotation and is caused to be shut in the configuration shown in FIG. 20. Upon deceleration, a potential spring force located at the hinged connections to the rotor hub wall 20 cause the hinged casings 21 and 22 to return to their opened configuration shown in FIG. 21. The hinged casings 21 and 22 serve two major functions. They serve to stow the retracted rotor blade assembly and to engage the zipper slider mechanism 16 which contributes to the collapsibility of the rotor system. Activation of the zipper slider mechanism 16 is made possible by each hinged casing 21 and 22 being simultaneously hinge connected to the rotor hub wall 20 and to hinged plates 116 and 117 of the zipper slider mechanism 16. When the hinged casings 21 and 22 are rotated about their connection to the rotor hub wall 20, a rotation about hinge connections 28 and 29 is also developed which then causes translation of a main zipper slider 110 of the zipper slider mechanism 16, as further described below with reference to FIGS. 33-35. Mechanical springs can also be located at hinge connections 28 and 29 to assist the operation of the zipper slider mechanism 16.

Interlink Assembly

Referring to FIGS. 10, 11, 12, 15, 19, 23 and 39, the interlink assembly 11 comprises the blade base 30 having a plurality of pin joints 31, guide notches 34, blade base rectangular slots 35, a thru hole 38, and a characteristic profile 32. The interlink assembly 11 further comprises a pneumatic damper and cable casing 33 having a collapsible corrugated geometry 36 and a slotted cylindrical section 37, and a plurality of link base subassemblies 12 which are repeated similar to links in a standard chain.

Figure 11:
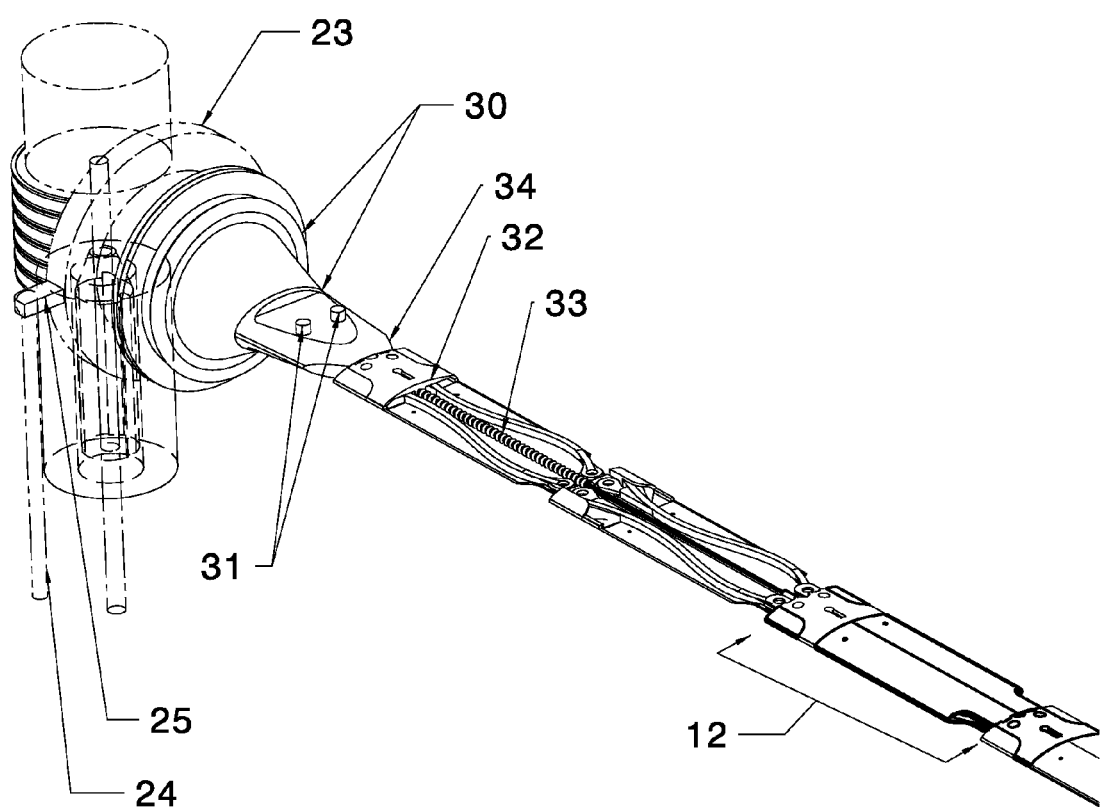
FIG. 11 is an isometric view of a retractable internal skeleton showing major components with several hinged plates removed to show internal components.

Referring to FIG. 11, the interlink assembly 11 can be thought of as a chain comprising of a base connected to repeating links, where each repeating link is referred to and corresponds to one of the link base subassemblies 12. Referring to FIG. 11 thru FIG. 18 and FIG. 39, at one extremity blade base 30 is mechanically connected to pitch disc 23 and at its other extremity is interconnected to a first link base subassembly 12 by way of rectangular base slots 35 and hub hinges 50 of first link base subassembly 12. In other words rectangular base slots 35 located at one extremity of blade base 30 serve as sockets for hub hinges 50 which are part of first link base subassembly 12. The link base subassembly 12 is the fundamental structure which forms the interior structure of the rotor blade 02, where one end of a first link base subassembly 12 is connected to the blade base 30 and the other end of the link base subassembly 12 is interconnected to a next link base subassembly 12. Referring to FIGS. 5, 11, 22, 23 and 39, the interlink assembly 11 forms a retractable internal support frame or internal scaffolding for the helical ribbon assembly 14 and flexible and elastic sleeve 15 such that when both the helical ribbon assembly 14 and flexible and elastic sleeve 15 envelope the interlink assembly 11 and are in their extended conditions, they form a rigid assembly with a characteristic airfoil profile.

Referring to FIGS. 12, 13, 17 and 18, the pneumatic damper 33 has two major features which enable its function: a collapsible section 36 with a corrugated geometry and a slotted cylindrical section 37. The slotted cylindrical section 37 has two notches which allow release cable 70 to pass through these notches and be connected to two locking arms 45 which are housed within a link base hub 40 of link base subassembly 12. The slotted cylindrical section 37 of damper 33 is clasped within link base hub 40, thereby ensuring that during extension or retraction of the rotor system only the corrugated section of the damper is collapsed or elongated. The pneumatic damper and cable casing 33 serves two major purposes. It serves as a cable housing for release cable 70 and as a damper which opposes the motion of interlink assembly 11 when it is extended or retracted. This allows for a more smooth deployment of the rotor blades. The pneumatic dampener 33 can also serve as an elastic spring.

Figure 15:
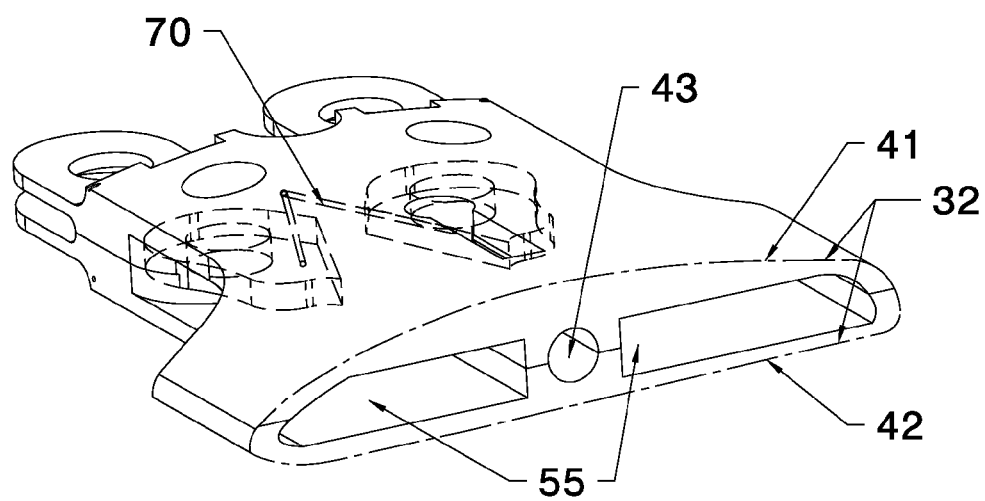
FIG. 15 is an isometric back view of the link base hub.
Figure 16:
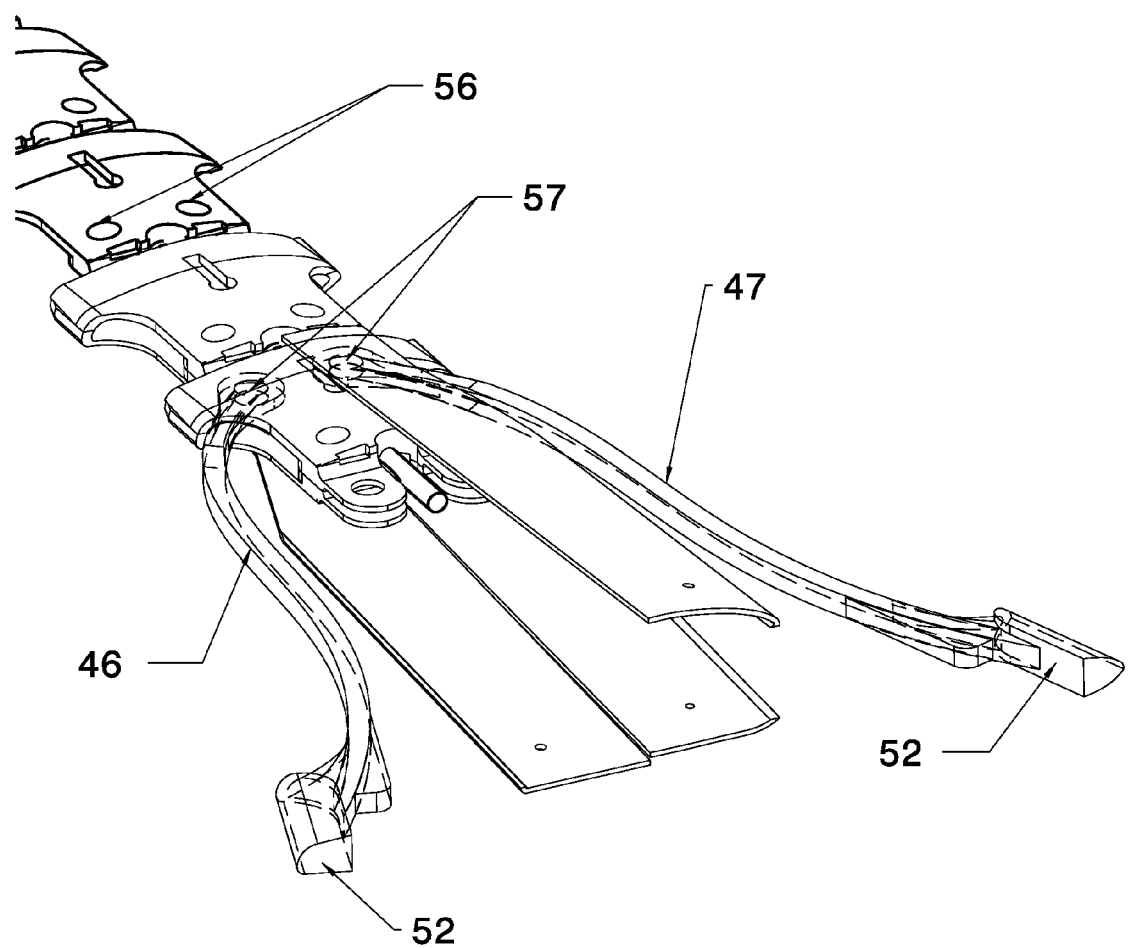
FIG. 16 is an isometric view of the interlink assembly in its retracted condition showing the mechanical operation of retractable links.
Figure 17:
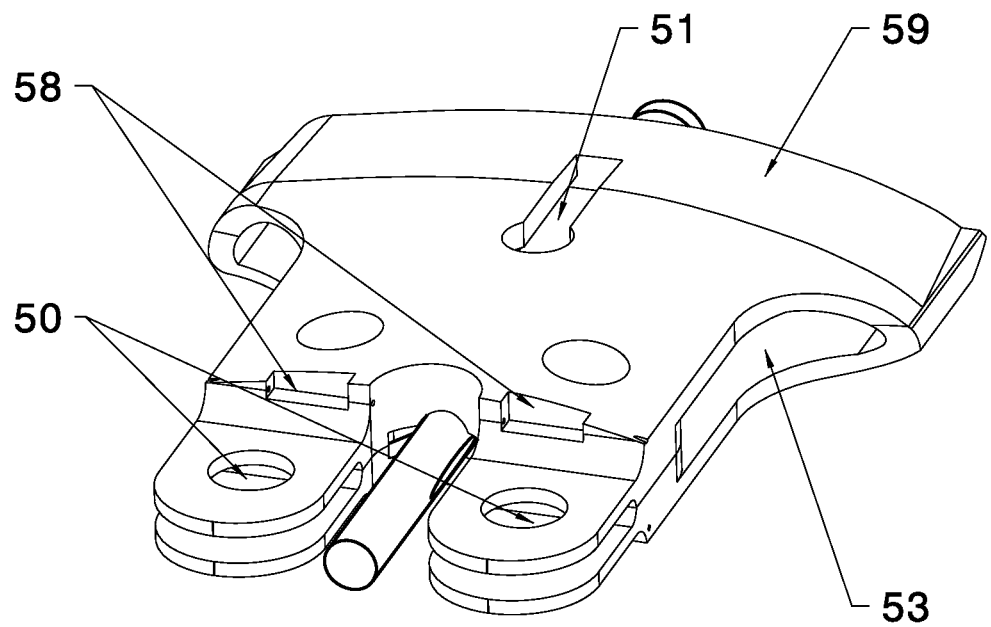
FIG. 17 is an isometric front view of the link base hub showing the hub ledge.
Figure 18:
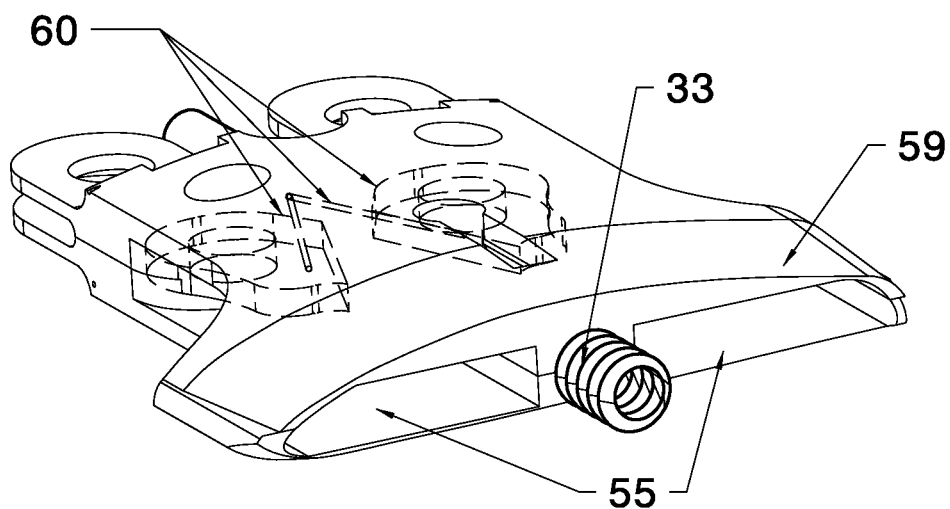
FIG. 18 is an isometric rear view of the link base hub showing the hub ledge and pneumatic dampener in their collapsed condition.

Referring to FIG. 4, FIG. 8, FIG. 9, FIG. 12, FIG. 16 and FIG. 20, retractability of the rotor system is achieved when each link base subassembly 12 is translated along the span of the rotor blade such that each subsequent link base subassembly 12 becomes stacked one atop the other while remaining connected to the next link base subassembly 12. This is achieved by way of retractable links 46 and 47 of the base link subassembly 12. In other words retractable links 46 and 47 are the means by which each subsequent link base subassembly 12 is interlinked. This is accomplished by way of hinged connections between link hinges 57 to hinges 50 of link base hub 40 and by passing linkages 46 and 47 through slotted openings 55 of a second link base subassembly 12 as shown in FIGS. 15 and 16. In accordance with a preferred embodiment of the invention, upon retraction interlink assembly 11 reconfigures from the configuration shown in FIG. 3 to the configuration shown in FIG. 4 and in both states remains one interconnected assembly.

Link Base Subassembly

Referring to FIGS. 11-18, the link base subassembly 12 comprises a top link hub 41 which has a slotted pin joint 51, and a bottom link hub 42. The link hub 41 and link hub 42 together form the link base hub 40 which has a characteristic airfoil profile 32 and is provided with a through hole 43, a hub ledge 59, link head grooves 53, hub hinges 50, slotted socket openings 55, threaded screw holes 56, the two locking arms 45, and a plurality of plate hinge sockets 58; The link base subassembly 12 further comprises a first retractable link 46 and a second retractable link 47 both provided with a curved profile 48, locking ledges 49, link heads 52, and link hinges 57. The link base subassembly 12 further comprises a plurality of hinged plates 44 which are hinged to link base hub 40 by way of hinged connections between plate hinges 54 and plate hinge sockets 58.

Figure 12:
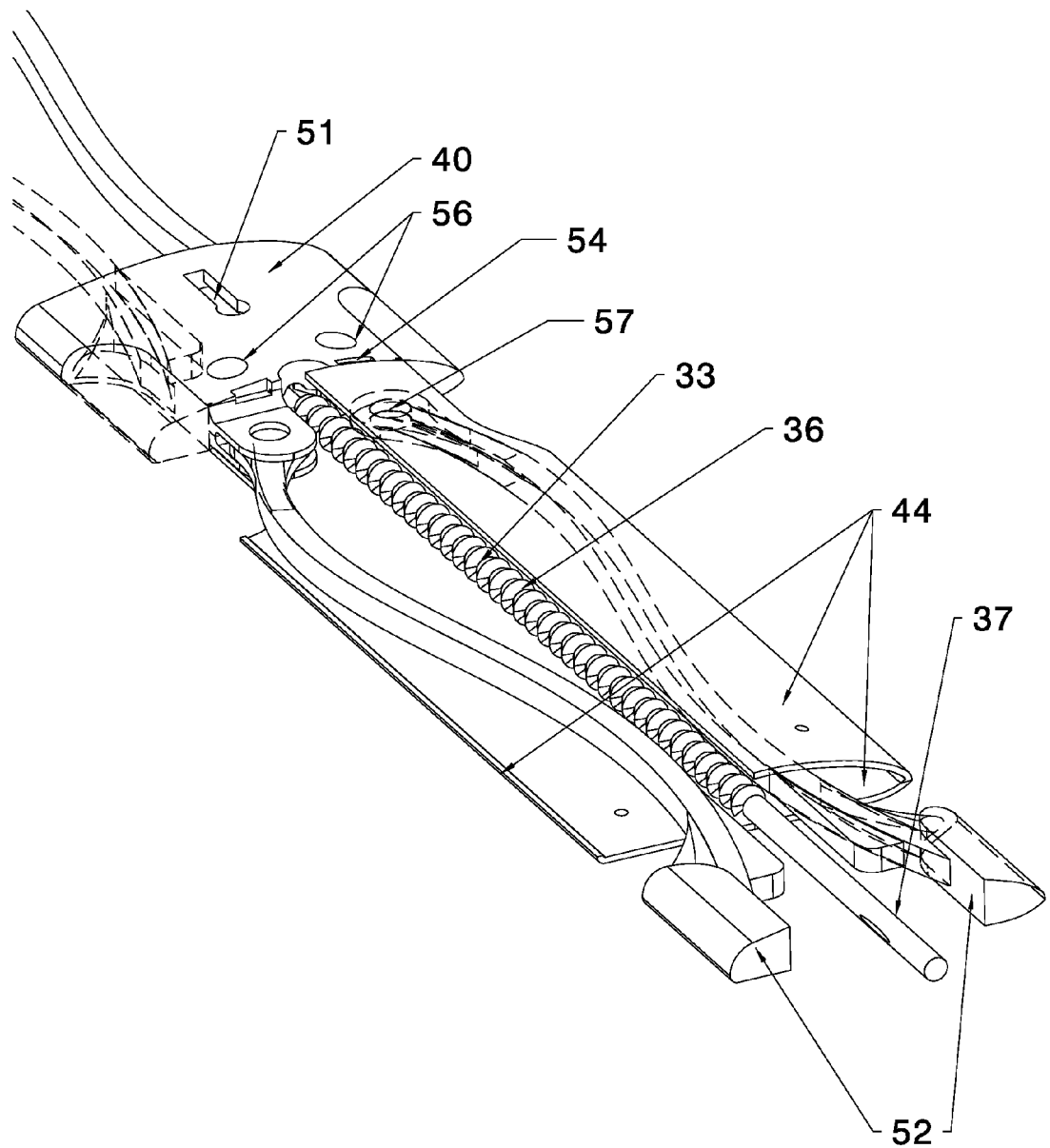
FIG. 12 is a perspective view of a link base subassembly showing the major components.
Figure 13:
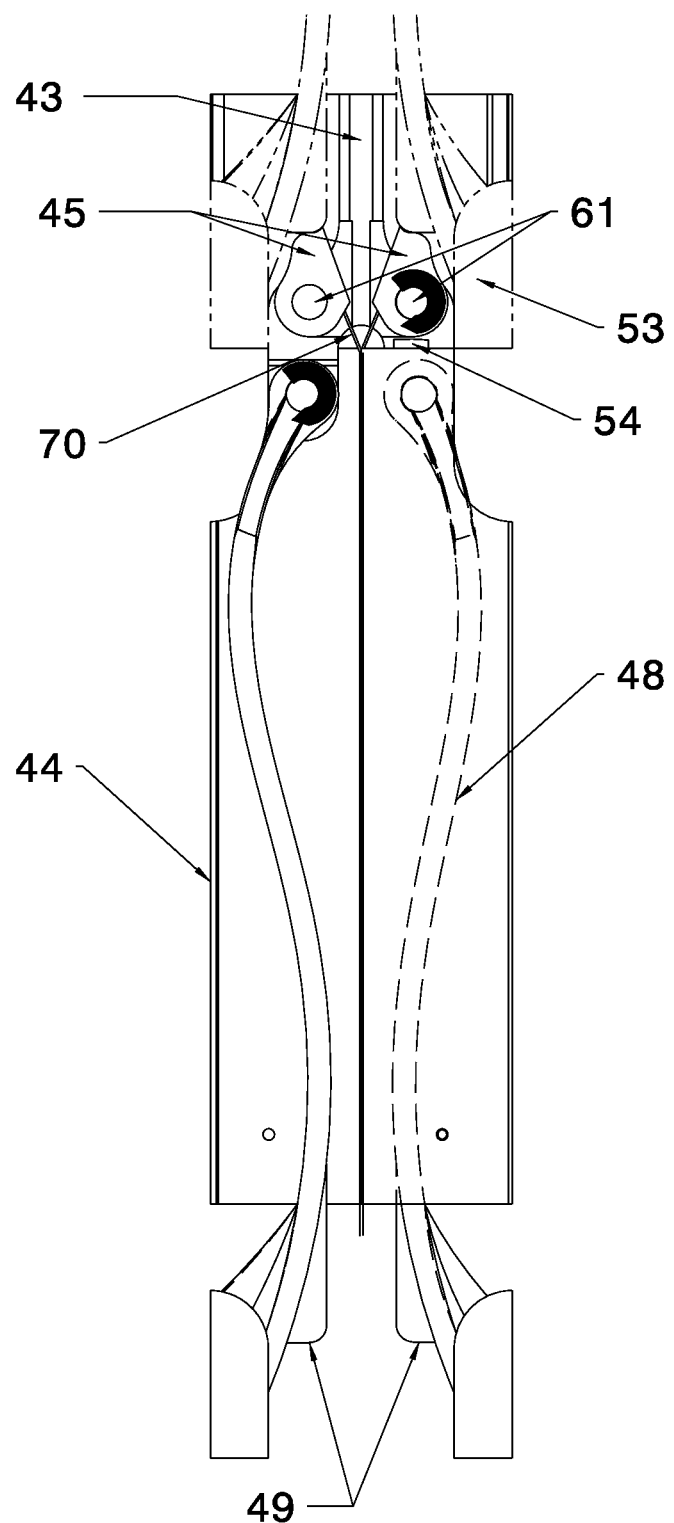
FIG. 13 is a partial, top, perspective view of the link base subassembly showing components and function of the internal locking mechanism and release cables.
Figure 14:
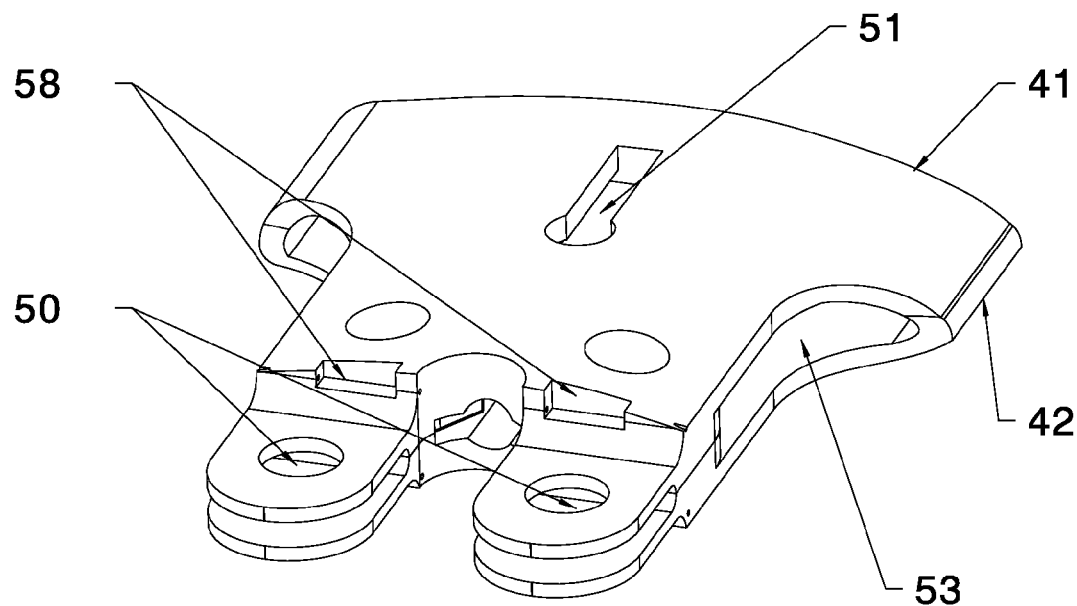
FIG. 14 is an isometric front view of a link base hub.

Referring to FIG. 13 thru FIG. 18, the link base hub 40 is shown to be formed of two sections, a section corresponding to the top link hub 41 and which forms the top of the airfoil profile 32, and a section corresponding to the bottom link hub 42 and which forms the bottom of the airfoil profile 32, the top and bottom link hubs 41, 42 being held together by way of screw holes which also serve to fasten a locking mechanism 60. Retractable links 46 and 47 are allowed to slide within link base hub 40 by way of slotted socket openings 55 and are prevented from sliding out during rotation by way of mechanical interference between link head grooves 53 and link heads 52. In this way, a mechanical linkage is formed and retractable links 46 and 47 are allowed to slide within the limits of the slotted socket opening 55. Referring to FIG. 12 and FIG. 13, the curved profile 48 of retractable links 46 and 47 serve two major purposes: one is to resist the torsion experienced by interlink assembly 11 during operation, and the other is to guide retractable links 46 and 47 outward during retraction to avoid interference with subsequent link base subassemblies. Link hinges 57 may be loaded with torsional springs to provide torque to the retractable links 46 and 47 in the direction shown in FIG. 13. This encourages each retractable link to pivot outward during retraction.

Each hinged plate 44 is hinged to link base hub 40 by way of plate hinge sockets 58 and plate hinges 54. Each hinged plate 44 extends from its hinged edge located on a first link base hub 40 to a next link base hub 40 such that its other unhinged edge rests on hub ledge 59 of the next link hub 40. Referring now to FIG. 12 thru FIG. 18, hinged plates 44 are hinged such that they form the shape of an airfoil surface while rotor blade 02 is extended and when the rotor blade 02 is retracted overlap one another like shingles.

The operation of locking mechanism 60 is described with reference to FIG. 12 and FIG. 13. Threaded screws holes 56 also serve as pin joints about which locking arms 45 are allowed to pivot. This is how the locking arms 45 are able to be rotated to the unlocked position. The mechanism 60 is locked by mechanical interference between locking ledge 49 located on retractable links 46 and 47 and the distal edge of locking arms 45. Locking pin joints 61 may be fitted with torsional springs which can be used to impart a permanent torque to locking arms 45 as shown in FIG. 13. This will ensure that the rotor blade system defaults to the locked position. Release cable 70 is connected to locking arms 45 such that translation of release cable 70 causes locking arms 45 to rotate about locking pin joints 61, thereby clearing the mechanical interference and unlocking the mechanism.

Retraction Reel Assembly

Referring to FIG. 19 thru FIG. 21 and FIG. 39, the retraction reel assembly 13 can be thought of as concentric shafts where each shaft contributes to the rotation, deceleration and/or retraction of the rotor system. The retraction assembly 13 serves to unlock and retract each rotor blade 02. The retracting reel assembly 13 comprises an exterior rotor axle 71, an interior rotor axle 72, and a breaking actuator 73 having a plurality of breaking notches 77 located at its exterior surface and an actuator chamfer 78 at its upper edge. The breaking actuator 73 is positioned coaxially and in between exterior rotor axle 71 and interior rotor axle 72. The breaking actuator 73 is able to rotate at a different rate relative to the exterior and interior rotor 71 and 72. The retracting reel assembly 13 also comprises a plurality of recoiling spools 74 which form a reel cage 75. Each recoiling spool 74 has fitted within it a plurality of breaking pins 76, where each recoiling spool acts as a bobbin when the retraction (release) cable 70 is wrapped around it. Each release cable 70 has one end connected to the edge of a recoiling spool 74 and has the other end passed thru through hole 38 and is connected to locking mechanism 60 by way of locking arms 45. The rotation of reel cage 75 is neutral when not engaged by breaking actuator 73 and is allowed to rotate about the interior rotor axle 72. The reel cage 75 is held within the rotor hub assembly 10 at the top by the upper part of interior rotor axle 72 and at the bottom by the exterior rotor axle 71.

The motion of the reel cage 75 is allowed to be neutral when the rotor blades are to be extended. Upon spin-up of the rotor system, the retraction reel assembly 13 experiences the same rotational speed as the rest of the rotor system by way of the tension imparted by release cables 70. To initiate retraction of the rotor blades 02, the breaking actuator 73 is translated vertically along its axis of rotation and is rotated at a different rotational speed than the rest of the rotor system such that it engages with and depresses the breaking pins 76 (FIG. 21). Each breaking pin 76 is fitted with a coaxially located helical spring 03 to provide a reaction force against a surface of breaking actuator 73. As breaking actuator 73 is translated upward, breaking pins 76 are guided into breaking notches 77 by way of actuator chamfer 78. The breaking pins 76 are then forced to translate radially outward while simultaneously being caught in breaking notches 77. This action effectively stops the reel cage 75 which is released from a neutral condition and assumes the rotation of breaking actuator 73. The action of recoiling spool 74 also serves to actuate locking mechanism 60 in link base hub 40. This action simultaneously unlocks locking mechanism 60 and develops a net force radially inward which consequently causes retractable links 46 and 47 to slide through slotted socket opening 55 and acts to retract the rotor blades inward toward the rotor hub assembly 10. Reel cage 75 and each recoiling spool 74 acts as a bobbin onto which release cable 70 is coiled and the rotor blade is then retracted.

Referring to FIG. 19 thru FIG. 21, each locking mechanism 60 is unlocked by a dedicated instance of release cable 70. One advantage of having a dedicated release cable 70 for each locking mechanism 60 is the ability to selectively unlock an individual locking mechanism 60 by modifying the geometry of breaking actuator 73 or the stacking order of recoiling spools 74 of reel cage 75.

Helical Ribbon Assembly

The purpose of helical ribbon assembly 14 is to serve as the primary axial and tensile load bearing subassembly and to reinforce the interlink assembly 11 and form a rigid structure over which a flexible sleeve can be fitted. Another purpose for the helically wound ribbon assembly 14 is to constrict, lock and immobilize the interlink assembly 11 when it is in use and allow the interlink assembly to retract when not in use. Referring to FIGS. 5, 6, 8, 10, 22 and 29, the helical ribbon assembly 14 comprises a plurality of sequentially overlapped ribbons 80 helically wound at an angle to each other in a crisscrossed braided pattern similar to a Chinese finger lock braid. Each helically wound ribbon 80 has at one or both ends thereof an end tab 81 and or a plurality of end pins 82. Each helically wound ribbon 80 comprises a plurality of laminated or woven 1 layers each helically wound around the interlink assembly 11 and held at either extremity by way of pin joints 31. Each helically wound ribbon 80 is held to the interlink assembly 12 by way of end tab 81 and or end pins 82. In the figures, helical ribbon assembly 14 is connected at one end to the blade base 30 by way of pin joints 31 and is connected at the other end to one of the link hub assemblies 12 by way of end pin 82. The purpose of end tab 81 is to provide a strong support to the laminated or woven composite fibers of the braided ribbons. This provides strength to the rotor system during operation.

Figure 8:
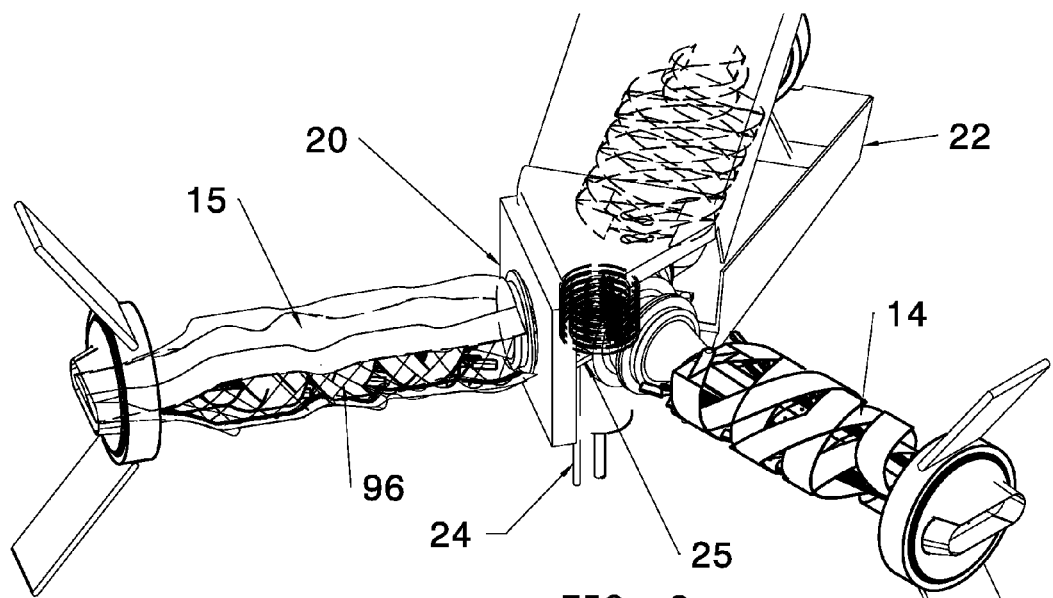
FIG. 8 is a perspective view of the rotor blade assembly showing operation of the major assemblies in their retracted condition.
Figure 29:
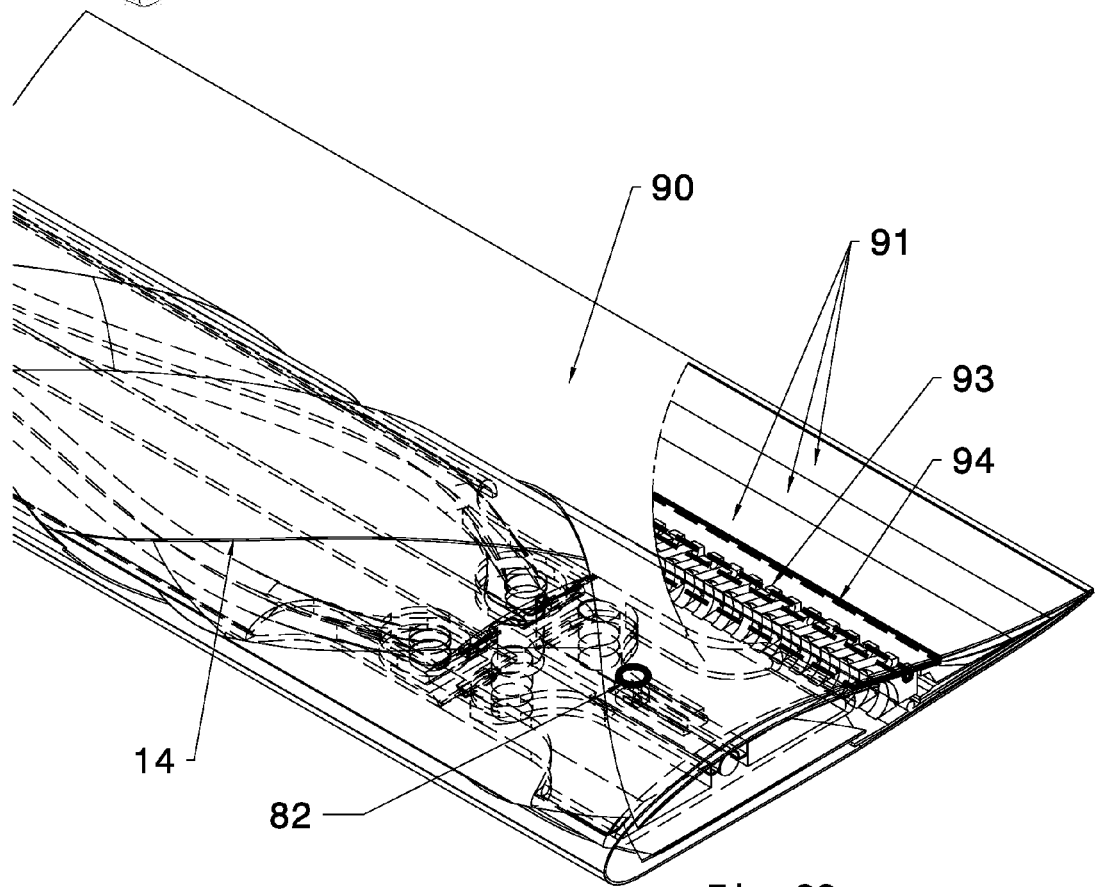
FIG. 29 is an enlarged partial cross-sectional view of a pin connection between the helically wound ribbon and internal skeleton.
Figure 30:
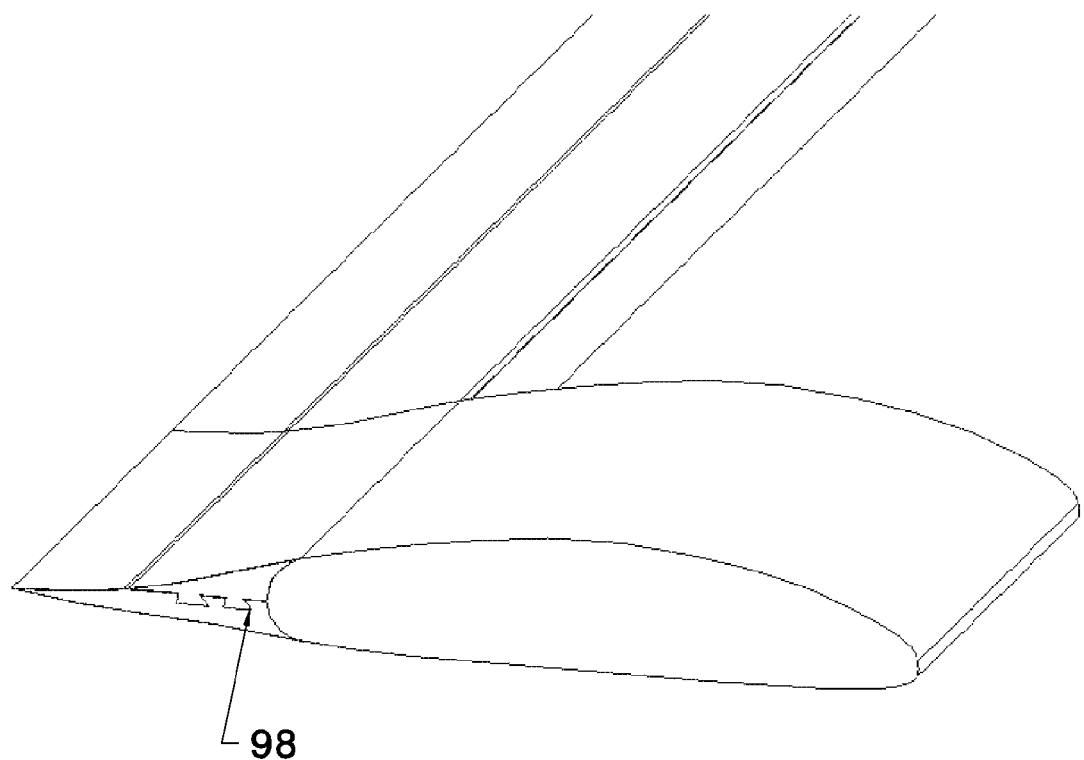
FIG. 30 is an enlarged isometric view of the elastic trailing edge end cap showing the tongue and groove geometry.
Figure 31:
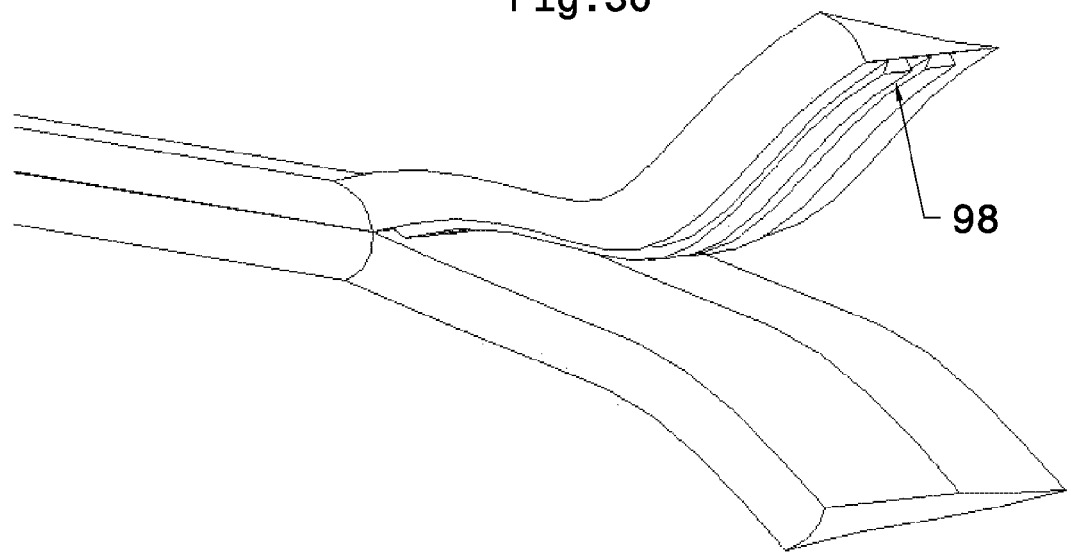
FIG. 31 is an enlarged isometric view of tongue and groove geometry.

By having a crisscrossed braided pattern similar to a Chinese finger lock braid and being helically wound at an angle to each other, each braided ribbon 80 is capable of changing the radial diameter of the helix which it forms. Upon retraction of the rotor blade 02, helical ribbon assembly 14 is also retracted and recoiled as shown in FIG. 8. Each helical ribbon 80 is sequentially overlapped such that they form a virtually flat uniform surface when the rotor system is in its extended condition, and when helical ribbon assembly 14 is retracted, it takes the profile of concentric spirals at the center of which is the retracted interlink assembly 11. Referring to FIG. 29, one extremity of helical ribbon assembly 14 is guided during retraction and deployment by end pin 82, where pin 82 fits in the slotted pin joint 51 of link base hub 40.

Figure 10:
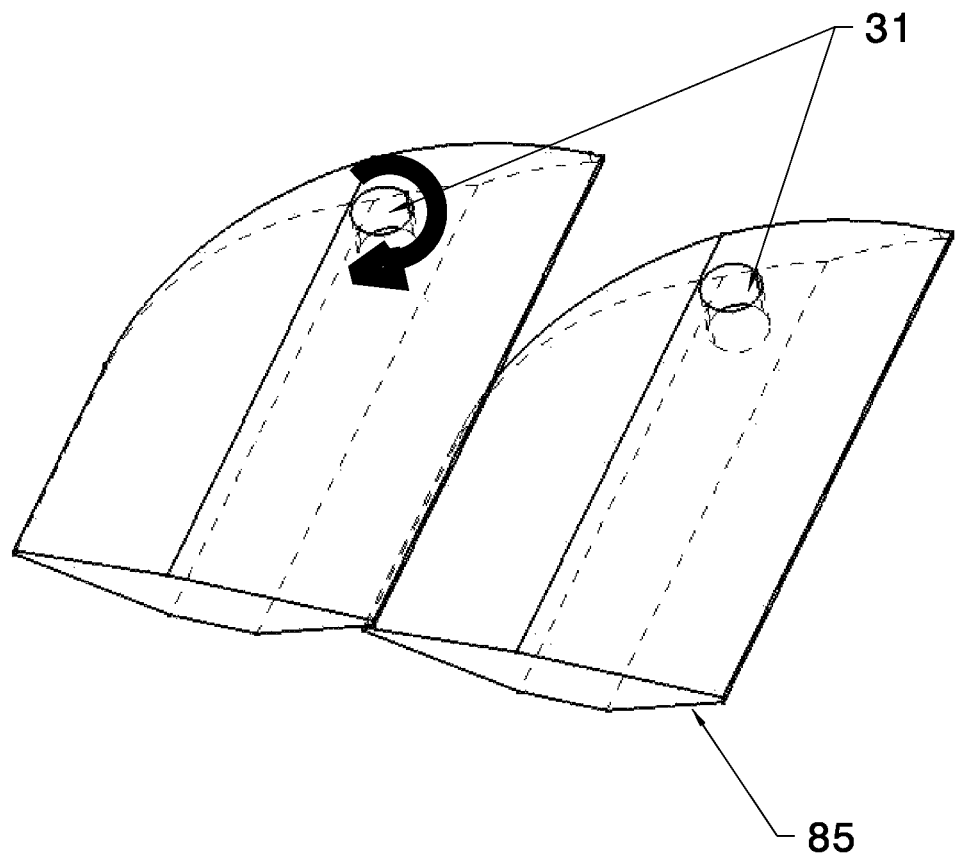
FIG. 10 shows a pair of end tabs arranged such that they do not interfere with each other during retraction and showing one possible direction of the torsional spring force.

In one embodiment, the braided ribbon 80 comprises a high strength fiber layer sandwiched by two low friction layers. By this construction, a plurality of the braided ribbons 80 are able to slide with low friction relative to adjacent ribbons. Referring now to FIG. 10, end tab 81 can be fitted with a torsional spring such that upon being rotated about pin joint 31, a torque is developed to restore end tab 81 to its original position.

Two end tabs 81 are arranged side by side to illustrate end tab cross sectional geometry 85. End tab cross sectional geometry 85 allows a plurality of end tabs 81 to be overlapped and/or arranged in proximity to each other and remain guided during rotation about pin joints 31 and upon release return to their original positions relative to an adjacent end tabs 81. Consequently, end tab cross sectional geometry 85 also ensures that each consecutive braided ribbon 80 is retracted relative to an adjacent braided ribbon 80 and is able to recoil without obstruction.

As described below for the flexible an elastic sleeve 15 with reference to FIG. 24 and FIG. 25, the functions of elastic sling membrane 95 and elastic fiber membrane 96 are to serve as guiding and separating interfaces between the components of helical ribbon assembly 14 and flexible and elastic sleeve 15.

Flexible and Elastic Sleeve

Figure 24:
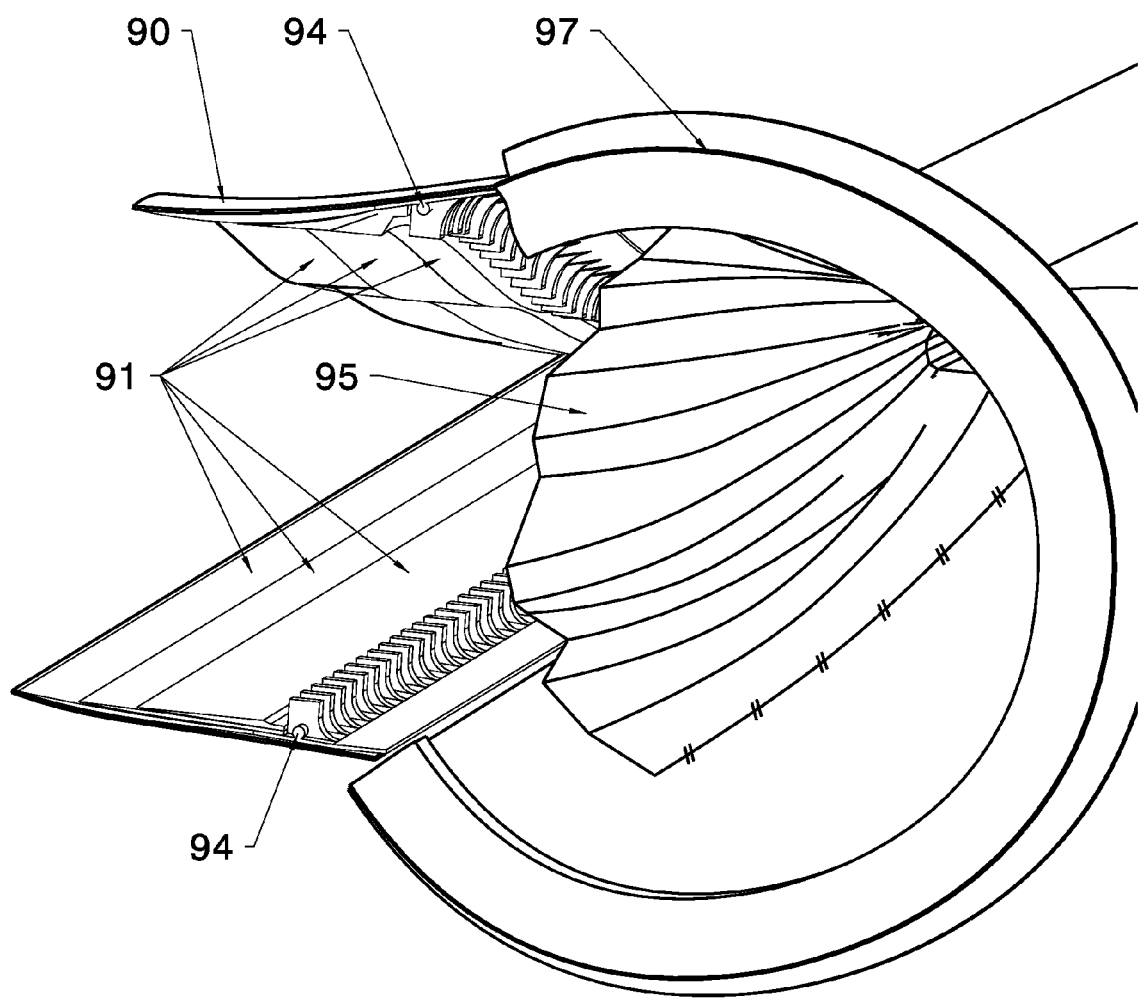
FIG. 24 is an isometric view of the construction of the flexible sleeve, elastic membrane and zipper closure showing how they are joined.
Figure 25:
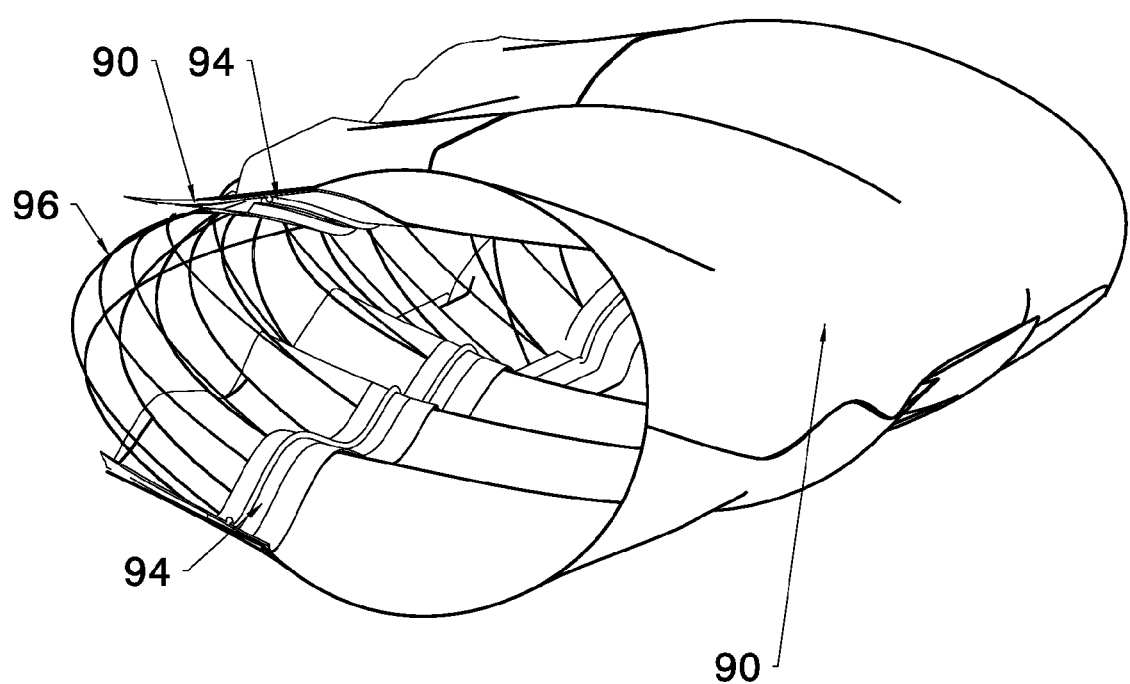
FIG. 25 is an isometric view of the flexible sleeve in its retracted condition showing an additional embodiment of the elastic membrane.
Figure 26:
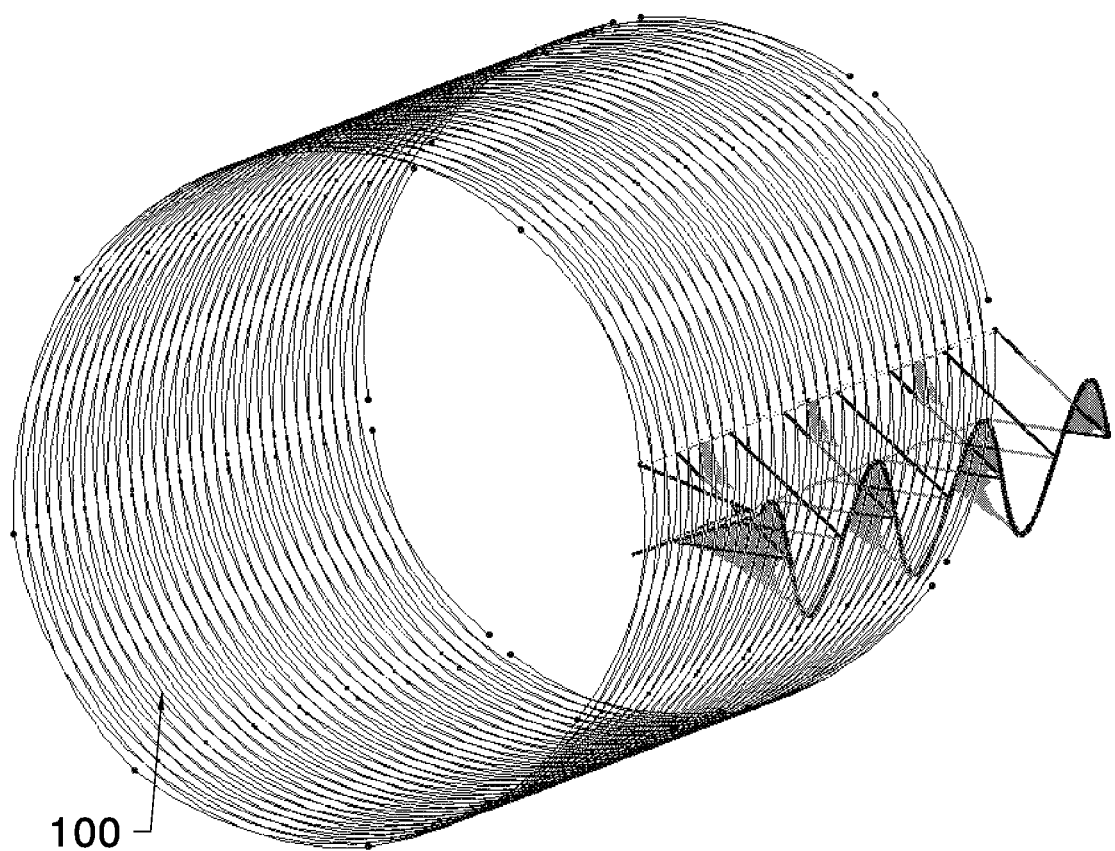
FIG. 26 is an isometric trailing edge view of the elastic skin showing a representation of the composite fiber helical weave pattern.
Figure 27:
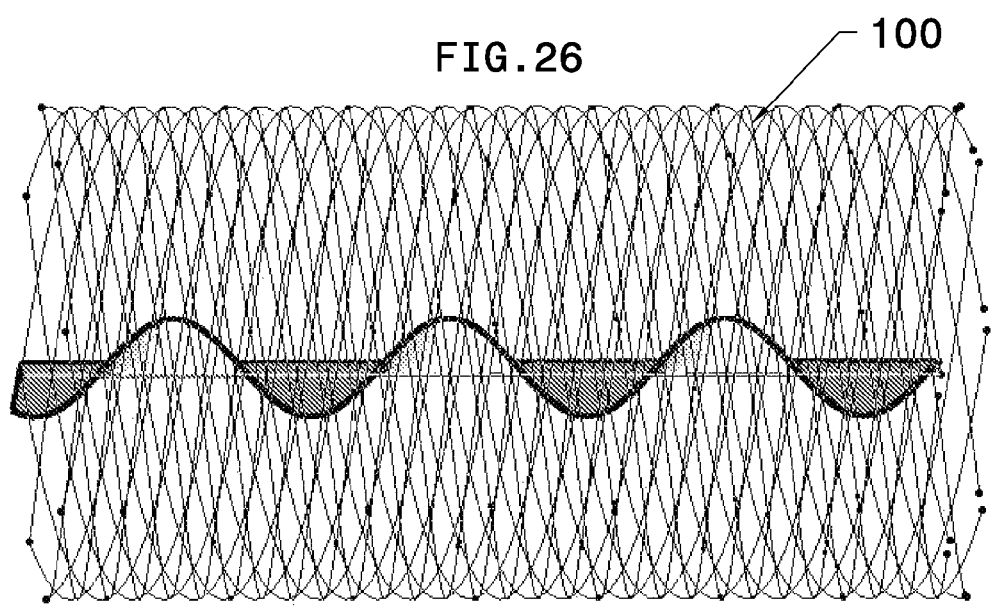
FIG. 27 is a trailing edge view of the elastic skin showing a representation of a composite fiber weave pattern and buckling pattern of the elastic trailing edge.

Referring to FIG. 24 thru FIG. 32 and FIG. 38, there is shown an embodiment of the flexible and elastic sleeve 15 which comprises a plurality of elastic ribs 101, elastic and flexible skin 90, and the elastic sling membrane 95. In this embodiment, elastic and flexible skin 90 is a continuous membrane formed of an elastomeric sheet or series of fibers which are laminated or woven and whose fibers are oriented at diagonals to each other which allow the skin to change its aspect ratio depending on the direction of the tension applied. In a preferred embodiment, flexible skin 90 is made of a fibrous, elastomeric, braided, and/or woven material, and/or any combination of the aforementioned materials to provide a flexible membrane which serves as an exterior surface configured to be exposed to the airstream. Elastic and flexible skin 90 can be made of a plurality of composite layers. These composite layers can be constructed of braided composite fibers. These braided composite fibers can be woven to take on beneficial patters which contribute to the strength and function of the rotor system. FIG. 26 and FIG. 27 show representations of a braided or woven pattern 100 which is capable of being longitudinally extended to thereby change the aspect ratio between the diameter and the longitudinal span of the braided or woven pattern. By the use of a braided pattern 100, the flexible and elastic sleeve 15 contributes to the constriction experienced by interlink assembly 11 and by helical ribbon assembly 14 when the rotor system is in its extended condition and allows for relaxation and expansion of the exterior skin when the rotor system is retracted.

Elastic ribs 101 and elastic sling membrane 95 impart rigidity to elastic and flexible skin 90 while themselves being flexible and elastic. Upon retraction, the use of elastic ribs 101 encourage organized corrugation of flexible and elastic sleeve 15. In other words, due to elastic rib 101, upon being retracted elastic and flexible sleeve 15 will be encouraged to ruffle. FIG. 4 and FIG. 8 illustrate interlink assembly 11, helical ribbon assembly 14 and flexible and elastic sleeve 15 in their retracted states. In other words, flexible and elastic sleeve 15 conforms to profile 32 of interlink assembly 11 when the rotor blade is in its extended condition, and when the rotor blade is retracted the flexible and elastic sleeve is able to buckle or ruffle to a predetermined pattern which is able to envelope the retracted interlink assembly and retracted helical ribbon assembly.

Figure 23:
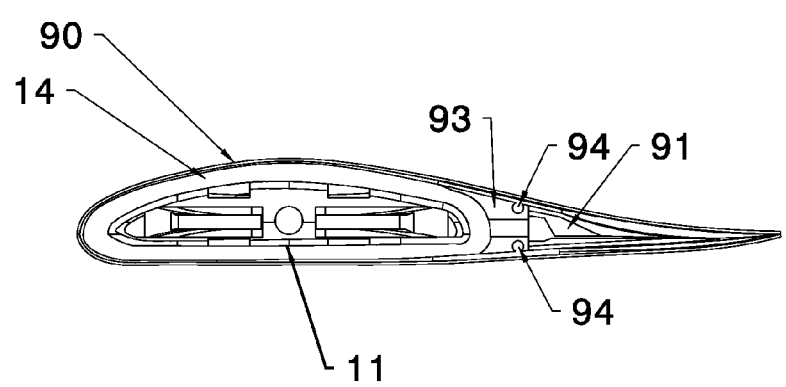
FIG. 23 is a view normal to the span of the lifting body showing a cross-section of the rotor blade and showing the characteristic aerodynamic linkage of the lifting body.

Referring to FIGS. 19, 20, 23, 24, 25 and FIG. 29, a second embodiment of flexible and elastic sleeve 15 is disclosed. The flexible and elastic sleeve 15 comprises flexible and elastic skin 90 which is made up of laminated or woven composites and has a sleeve lip 97, a sleeve retainer ring 92 which holds the sleeve lip 97 onto the blade base 30 and prevents the sleeve lip from sliding off the rotor blade during rotation, a plurality of elastic trailing edge strips 91, a plurality of zipper teeth 93 which are spaced along a zipper web 94 such that a zipper closure is formed between a top zipper half and a bottom zipper half where both halves extend along an upper and lower longitudinal edge of flexible and elastic skin 90, and elastic sling membrane 95 and/or an elastic fiber membrane 96. Referring to FIG. 23, the zipper teeth are connected to the zipper web 94 by crimping one edge of the zipper teeth 93 along the zipper web 94.

Referring to FIG. 23 and FIG. 24, at a top longitudinal edge and at a bottom longitudinal edge of the flexible and elastic skin 90 there is connected a top and a bottom flexible and elastic trailing edge subassembly. The flexible and elastic trailing edge subassembly comprises a plurality of flexible an elastic trailing edge strips 91 which are individually laminated or extruded to form longitudinal sections of a rotor blades trailing edge and are fastened along one edge to each other to form an upper trailing edge and a lower trailing edge. When the rotor blade is in its extended condition and the zipper closure is in its fastened or zipped condition, the aforementioned components form a rigid airfoil trailing edge. The trailing edge subassemblies can be constructed by way of adhering or stitching each corresponding longitudinal edge of the zipper web 94 to a corresponding longitudinal edge of the elastic skin 90 and to the longitudinal edge of the flexible trailing edge strips 91, thereby creating a seam which serves as a permanent fastening between them. Each individual layer of the trailing edge subassembly is stiff enough that when stacked together they form a rigid structure and are flexible enough that when retracted are able to buckle and ruffle.

Figure 32:
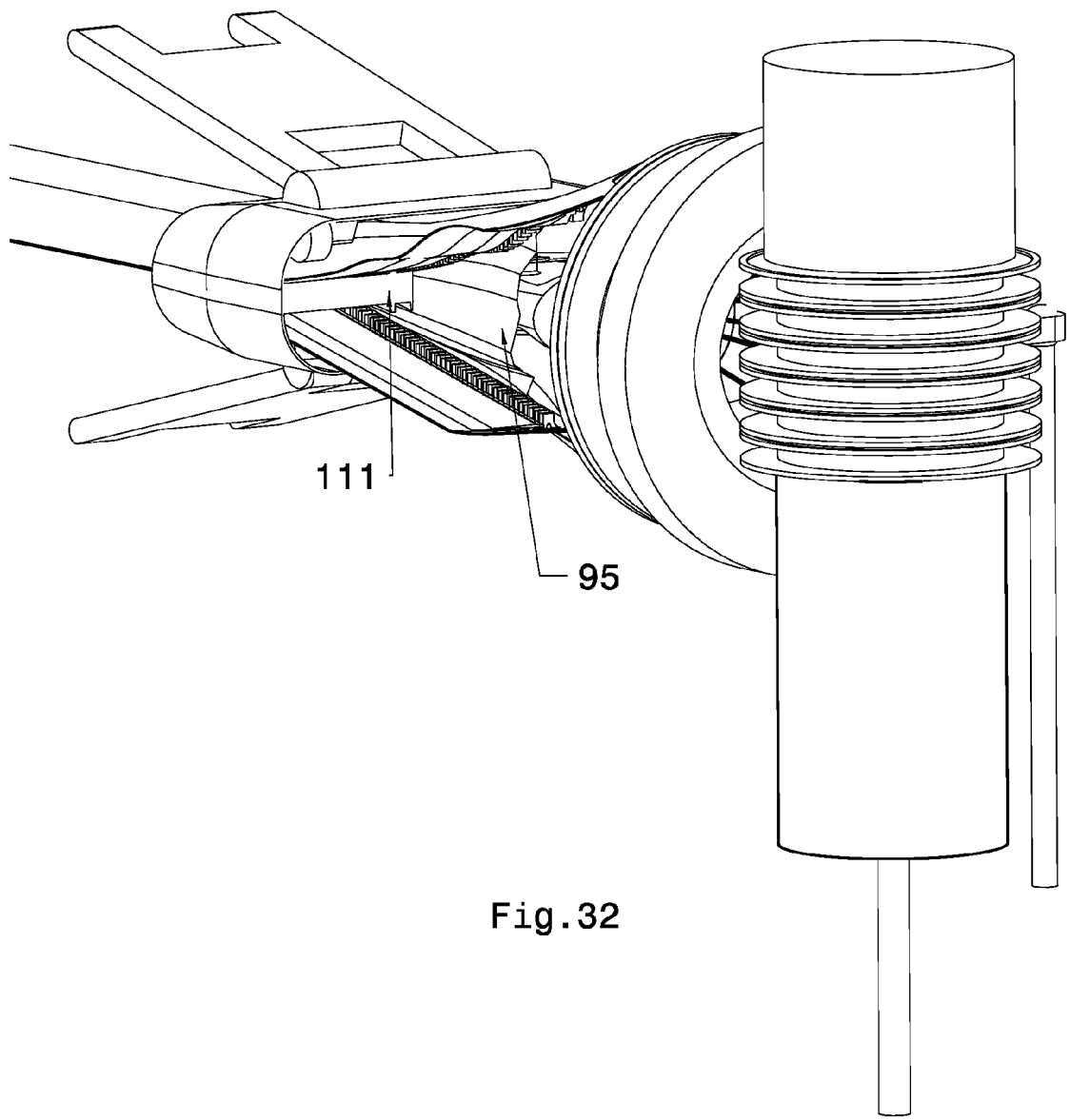
FIG. 32 is an isometric rear view of the configuration of the zipper tooth closure and zipper slider function.

Referring now to FIG. 24, there is an additional embodiment of elastic membrane 95 which is folded along its length to form a pleated accordion pattern with a top longitudinal edge of the accordion pattern connected to the longitudinal edge of a top zipper web 94 and at the bottom longitudinal edge of the accordion pattern connected to the longitudinal edge of a bottom zipper web 94. Referring to FIG. 19, FIG. 24 and FIG. 32 the inner face of elastic sling membrane 95 comes in direct contact with the exterior surface of helically wound ribbon assembly 14 and on its other face comes in contact with the inner surface of the zipper wedge 111. This configuration creates a barrier between the helical ribbon assembly 14 and the main zipper slider 110. In this way elastic membrane 95 acts as a guiding interface between helical ribbon assembly 14 and the zipper closure formed by zipper teeth 93. This allows flexible and elastic sleeve 15 to buckle over the interlink assembly 11 and helical ribbon assembly 14 while retaining its ability to return to its prior condition and shape when the rotor system is extended or retracted. Another use for the elastic membrane 95 is to guide the top and bottom zipper teeth during opening and closing of the zipper system and also serves to prevent snags, misalignment and interference of the zipper teeth 93.

Figure 28:
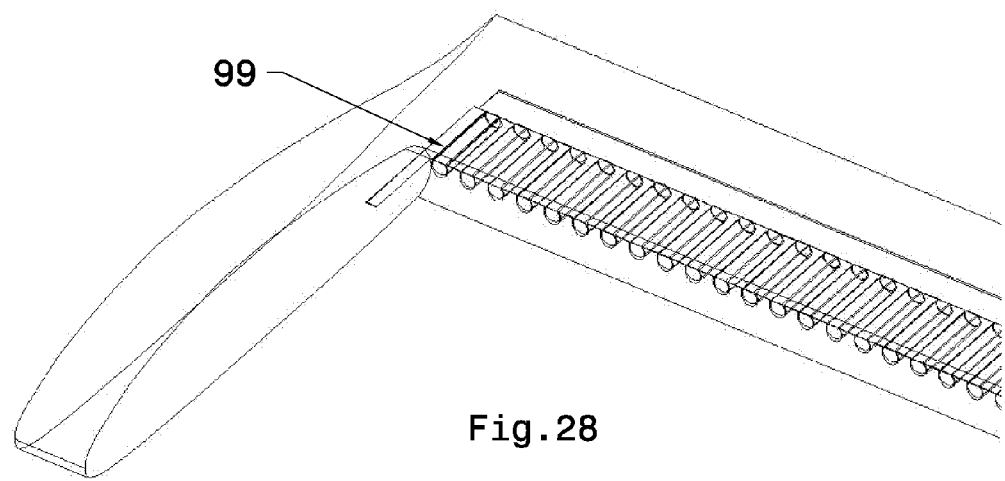
FIG. 28 is an isometric view of the end cap of elastic trailing edge showing hook and hollow geometry.

Referring to FIG. 25, elastic fiber membrane 96 is shown serving the same function as elastic sling membrane 95 and is shown to be made up of fibers oriented one across the other with one extremity of the each fiber connected to a top zipper web and the other end connected to a bottom zipper web. In this way, a webbed matrix which connects the top and bottom sections of the elastic sleeve is formed. Interlocking tongue and groove geometry 98 shown in FIG. 30 and Fig. 31 and hook and hollow geometry 99 shown in FIG. 28 represent additional possible closure types for flexible and elastic sleeve 15.

Zipper Slider Mechanism

Referring now to FIG. 5, FIG. 19, and FIG. 33 thru FIG. 35, the zipper slider mechanism 16 comprises a main slider 110 encompassing flexible and elastic sleeve 15 and serving as the primary means by which the closure formed by flexible and elastic sleeve 15 is zipped and unzipped. The major features which enable the main slider's function are a zipper wedge 111 located on the inner surface of the main slider's trailing edge and having a top and bottom wedge track 112 which serve to guide the zipper teeth 93 during extension and retraction of the rotor blade, a first spring loaded wheel 113 located at the top of the inner surface of the main slider 110, a second spring loaded wheel 114 located at the bottom of the inner surface of the main slider 110, a third spring loaded wheel 115 located on the inner surface of the main slider's leading edge where each spring loaded wheel serves to assist in the retraction of the flexible and elastic sleeve 15 by way of a spring potential which is generated during extension of the rotor blades and caused by mechanical friction between the spring loaded wheels and the exterior surface of the flexible skin 90, a first hinged plate 116 having one end hinged to the top of the main slider and the other end hinged to the inner surface of the top rotor casing 21, and a second hinged plate 117 having one end hinged to the bottom of the main slider and the other end hinged to the inner surface of the bottom rotor casing 22.

The main slider 110 serves the same function as a conventional zipper slider whereby it is translated along the length of the rotor blade 02 to open and close the zipper closure created by the flexible and elastic sleeve 15. Referring now to FIG. 20 and FIG. 21, a first hinged plate 116 is connected to the top hinged blade casing 21 by way of top hinge connection 28 and to the main slider 110 by way of top slider hinge 118. The second hinged plate 117 is connected at one end to the blade bottom hinged casing 22 by way of a bottom hinge connection 29 and at the other end to the main slider 110 by way of a slider bottom hinge 119. When the rotor system is at rest and in its retracted condition as shown FIG. 21, upon application of a rotational acceleration to the rotor system the top and bottom casings 21 and 22 begin to rotate about their corresponding hinged connections to the hub wall 20. This motion causes the angles between the hinged plates and the blade casings to be altered and thereby cause the main slider 110 to be translated along the span of the rotor blade.

Figure 35:
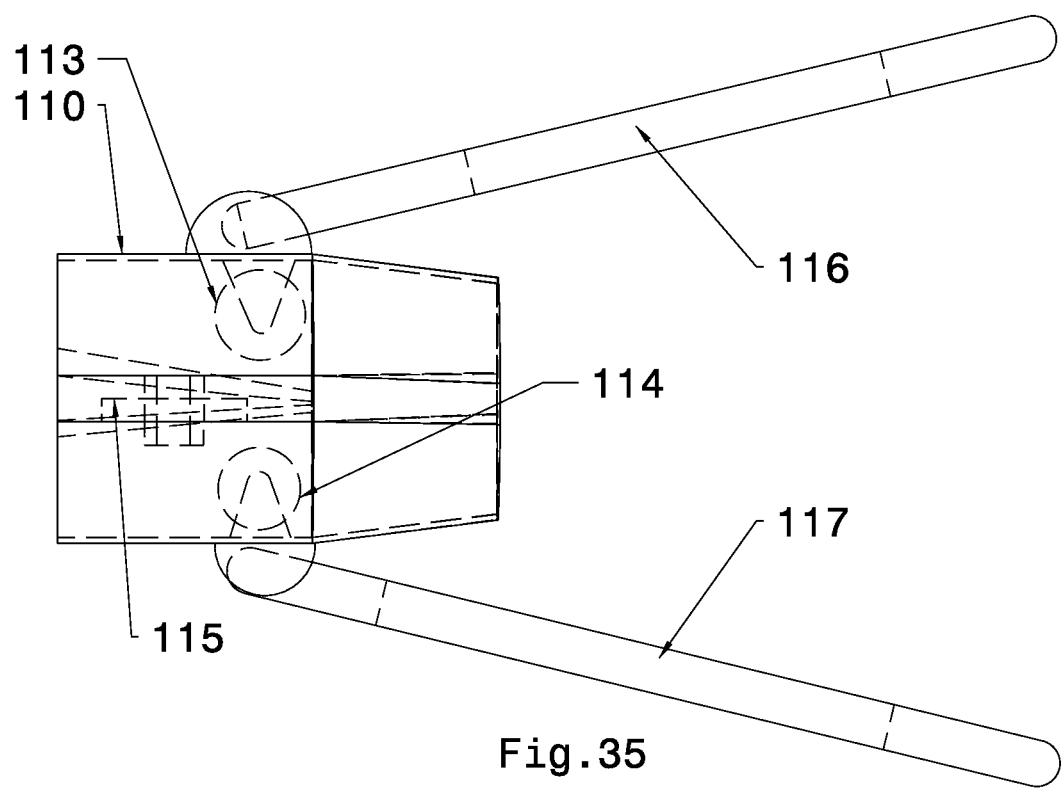
FIG. 35 is a side view of the zipper slider of the invention.

Referring to FIG. 19 and FIG. 35, spring loaded wheels 113, 114 and 115 are equipped with torsion springs whereby extension of the rotor blade assembly causes the spring loaded wheels to develop a potential to roll the elastic and flexible sleeve 15 back to its prior condition. The roller wheels also impart a frictional force to the trailing edge zipper serving to assist in guiding the zipper teeth 93 along the wedge track 112, and upon unlocking the assembly and in the absence of a rotational force, assisting to return the assembly to its contracted state. FIG. 32 shows how spring loaded wheels 113,114,115 and wedge track 112 work together to guide zipper teeth 93 during retraction and extension.

Figures 36, 37:
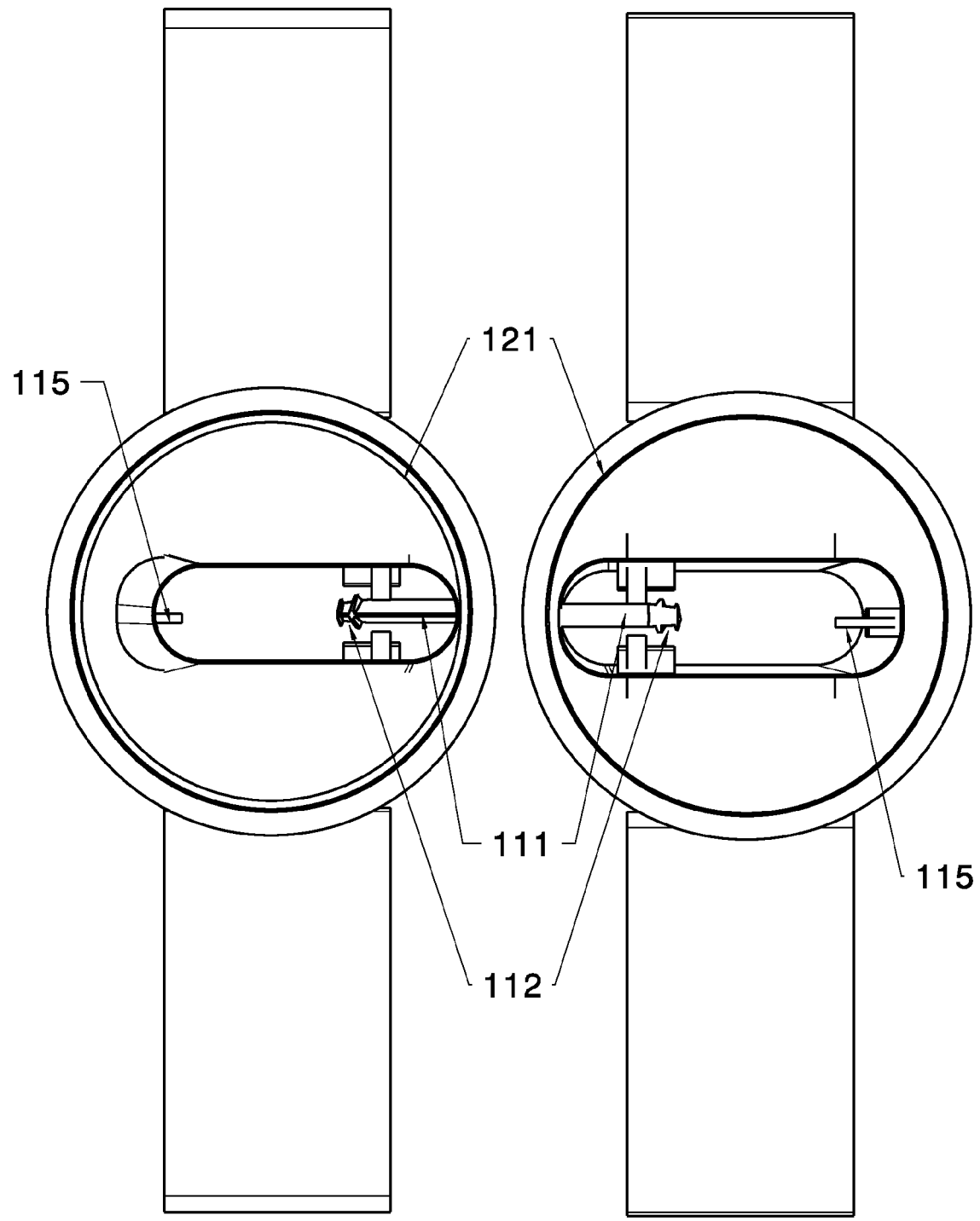
FIG. 36 is a front axial view of another embodiment of the zipper slider of the invention showing the zipper slider ring bearing.
FIG. 37 is a rear axial view of another embodiment of the zipper slider of the invention showing the zipper slider ring bearing.
Figure 38:
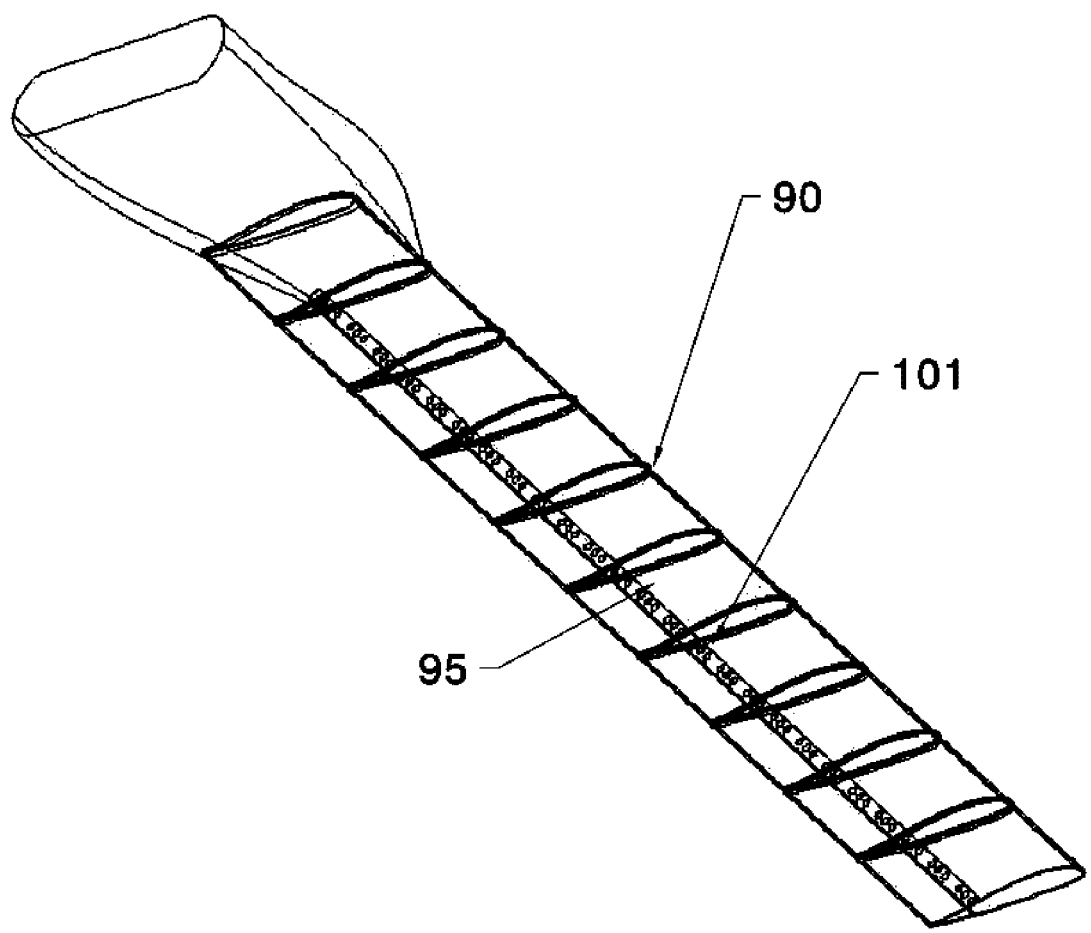
FIG. 38 is an isometric trailing edge view of the elastic skin showing the composite construction of a rib-reinforced polymer matrix in the shape of an airfoil.
Figure 39:
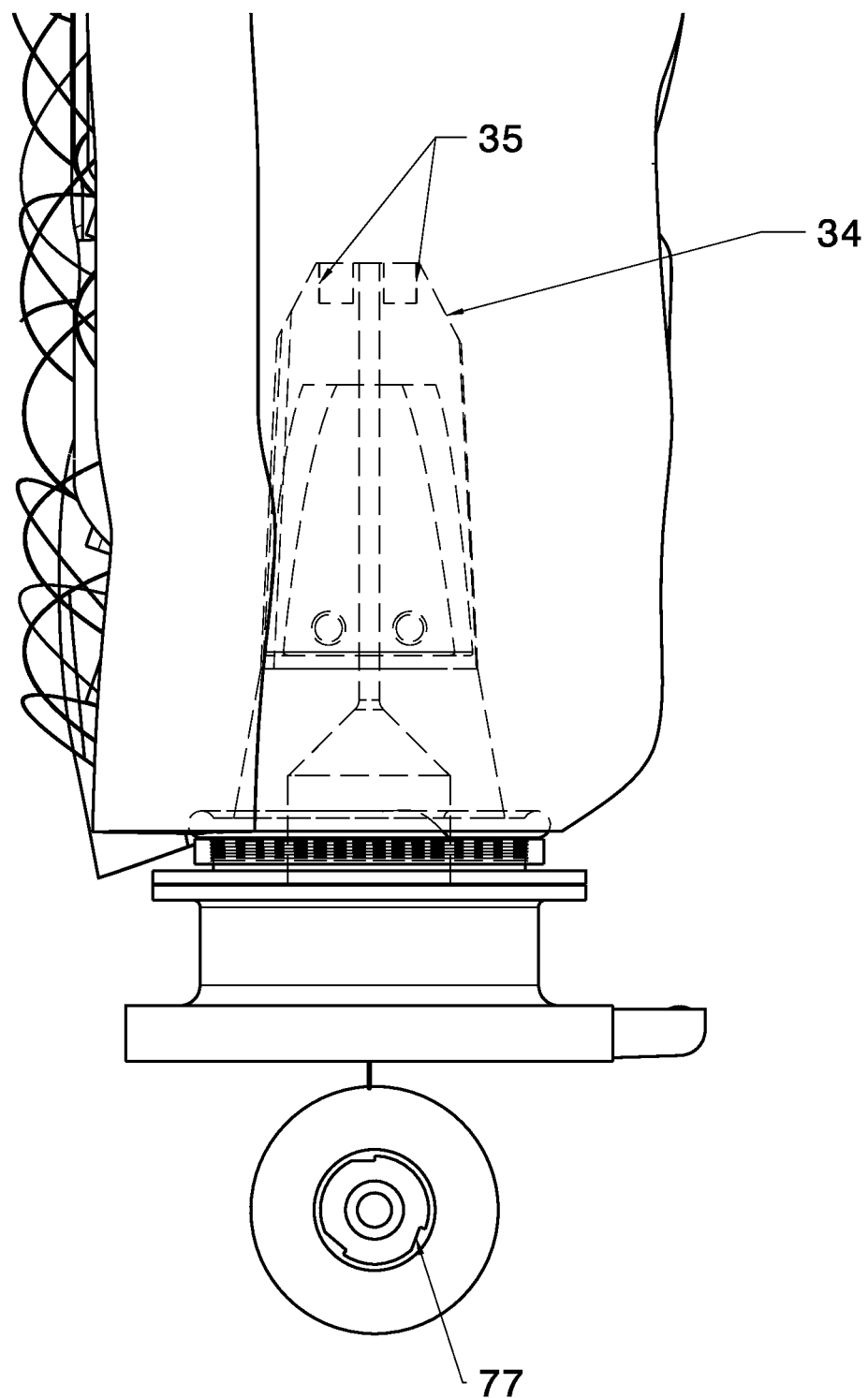
FIG. 39 is a top view of the rotor blade assembly showing the blade base.

Referring now to FIG. 36 and FIG. 37, a second embodiment of the zipper slider mechanism is disclosed. In this embodiment, the main slider 11 has a circular exterior profile and is coaxial to and encompassed by a circular ring bearing 121, where the ring bearing 121 is hinged at its upper and lower extremities to the top and bottom blade casings, respectively. The purpose of the ring bearing is to allow the main slider to rotate about its longitudinal axis in unison with and in response to the rotation of pitch disc 23.

Operation of the Retractable Rotor Blade Assembly

When the engine of the vehicle (aircraft) is energized, the rotor hub assembly 10 rotates and a centripetal force is developed. The rotor blade assembly is expanded by the centripetal force acting on the components which are free to move, that is, the rotor blade is extended radially outward from the axis of rotation. During the expansion of the rotor blade, the following operations occur. The distal tip of the rotor blade starts to extend radially outward and the zipper slider mechanism 16 brings the upper and lower trailing edges of the flexible an elastic sleeve's zipper together and thereby closes the zipper as it extends outward.

At the same time, during the expansion process the interlink assembly 11 along with each link base subassembly 12, through the rotation of their hinged linkages, are allowed to extend radially outward and engage the locks in the link base hub 40, through the locking ledge 49 engaging with the locking arm 45. Also at the same time, the flexible and elastic sleeve 15 and the helical ribbon assembly 14 are extended outward, by way of centripetal force and mechanical connections to the interlink assembly 11, and develop constricting effect which serves to rigidify the rotor blade. The combination of the locking mechanism, the elastic sleeve and the zipper system provide a flexural and lateral bending stiffness and rigidity to the rotor blade which is required for a lift action on the aircraft.

When the rotational speed of the engine is reduced and the aircraft begins to be stopped, the centripetal force is reduced and approaches to zero. At the same time, the retraction reel assembly 13 and breaking actuator 73 (components of the rotor blade 02), through the release cables 70, unlock and pull the interlink assembly radially inward towards the central axis 72. Also at the same time, during the retraction process the zipper slider mechanism 16 unzips the flexible and elastic sleeve as it is being retracted and serves to guide the helical ribbon assembly 14 back to their retracted conditions. These operation leads to a retracted rotator blade system.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

What is claimed is:

1. A retractable rotor blade assembly for providing vertical lift to a vehicle, the retractable rotor blade assembly comprising:
   a rotor hub assembly having a rotor hub wall and a pitch disc having a longitudinal axis and being mounted to the rotor hub wall for undergoing rotation about the longitudinal axis; and
   a plurality of retractable rotor blades each configured to be extended and retracted relative to the rotor hub assembly, each of the rotor blades comprising an interlink assembly including a plurality of interconnected link base subassemblies each configured to be translated along a span of the rotor blade such that each subsequent link base subassembly becomes stacked one atop the other while remaining connected to a next link base subassembly, a blade base interconnected between the pitch disc of the rotor hub assembly and one of the interconnected link base subassemblies, and a damper for dampening movement of the interlink assembly during extension and retraction of the rotor blade.

2. A retractable rotor blade assembly according to claim 1; wherein the damper has a collapsible section with a corrugated geometry and a slotted cylindrical section; and wherein each of the link base subassemblies has a link hub within which the slotted cylindrical section of the damper is mounted for ensuring that during extension or retraction of the rotor blade only the collapsible section is collapsed or elongated, a pair of locking arms housed in the link hub for locking the rotor blade in the extended state, and a pair of retractable links by which the link base subassembly is interconnected with another of the link base subassemblies.

3. A retractable rotor blade assembly according to claim 1; further comprising a helical ribbon assembly for reinforcing the interlink assembly, the helical ribbon assembly comprising a plurality of sequentially overlapped ribbons each formed of a plurality of laminated or woven layers, each of the layers being helically wound around the interlink assembly.

4. A retractable rotor blade assembly according to claim 3; further comprising a flexible and elastic sleeve configured to cover the interlink assembly and the helical ribbon assembly in the extended and retracted states of the rotor blade.

5. A retractable rotor blade assembly according to claim 4; wherein the flexible and elastic sleeve has a flexible and elastic skin and a plurality of elastic ribs for imparting rigidity to the flexible and elastic skin.

6. A retractable rotor blade assembly according to claim 4; wherein the flexible and elastic sleeve further comprises top and bottom zipper halves forming a zipper closure; and further comprising a zipper slide mechanism having a main zipper slider for undergoing sliding movement to zip and unzip the zipper closure of the flexible and elastic sleeve during extension and retraction of the rotor blade.

7. A flying vehicle having the retractable rotor blade assembly according to claim 1.

8. An interlink assembly for a retractable rotor blade configured to undergo extension and retraction movement, the interlink assembly comprising: a plurality of interconnected link base subassemblies each configured to be translated along a span of the rotor blade such that each subsequent link base subassembly becomes stacked one atop the other while remaining connected to a next link base subassembly, each of the link base subassemblies having a damper configured to dampen movement of the interlink assembly during extension and retraction of the rotor blade.

9. An interlink assembly according to claim 8; wherein each of the link base subassemblies has a pair of retractable links by which the link base subassembly is interconnected with another of the link base subassemblies, a link hub, and a pair of locking arms housed in the link hub for locking the rotor blade in the extended state.

10. A flying vehicle having the interlink assembly according to claim 8.

11. A retraction reel assembly for retracting a rotor blade configured to undergo extension and retraction movement, the retraction reel assembly comprising: a pair of rotor axles configured to undergo rotation for imparting a torque to the rotor blade, a breaking actuator disposed coaxially between the rotor axles for undergoing rotation and having a plurality of breaking notches located at an exterior surface of the breaking actuator, and a real cage formed of a plurality of recoiling spools around which respective ones of retraction cables are configured to be wrapped, each of the recoiling spools having a plurality of breaking pins configured to be guided into the breaking notches during retraction of the rotor blade.

12. A flying vehicle having the retraction reel assembly according to claim 11.

* * * * *